US009588514B2

(12) United States Patent
Christensen et al.

(10) Patent No.: US 9,588,514 B2
(45) Date of Patent: Mar. 7, 2017

(54) COMMISSIONING FIELD DEVICES IN A PROCESS CONTROL SYSTEM SUPPORTED BY BIG DATA

(71) Applicant: FISHER-ROSEMOUNT SYSTEMS, INC., Round Rock, TX (US)

(72) Inventors: Daniel Dean Christensen, Austin, TX (US); Ken J. Beoughter, Round Rock, TX (US); Terrence L. Blevins, Round Rock, TX (US); Mark J. Nixon, Round Rock, TX (US); Paul R. Muston, Narborough (GB); Wilhelm K. Wojsznis, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 0 days.

(21) Appl. No.: 14/605,304

(22) Filed: Jan. 26, 2015

(65) Prior Publication Data
US 2016/0216706 A1 Jul. 28, 2016

(51) Int. Cl.
*H01L 21/00* (2006.01)
*G05B 19/418* (2006.01)

(52) U.S. Cl.
CPC ............ *G05B 19/41865* (2013.01); *G05B 2219/31395* (2013.01)

(58) Field of Classification Search
CPC ............. G01D 21/00; H04W 56/002; H04W 56/0015; H04W 24/00; H04W 80/00;
(Continued)

(56) References Cited

U.S. PATENT DOCUMENTS 7,570,922 B2 * 8/2009 Williams ............... G06Q 10/06
455/422.1
7,640,007 B2 12/2009 Chen et al.
(Continued)

FOREIGN PATENT DOCUMENTS

GB 2 524 176 A 9/2015
JP H04-303205 A 10/1992
(Continued)

OTHER PUBLICATIONS

HART Communicator YHC5150X, Yokogawa Corporation of America, 2014, 2 pages.
(Continued)

*Primary Examiner* — Thinh T Nguyen
(74) *Attorney, Agent, or Firm* — Marshall, Gerstein & Borun LLP

(57) ABSTRACT

Techniques for determining device-specific information such as commissioning data, location information, images, and other data descriptive of a process device installed in a plant include obtaining the device-specific information at a local device during the process device's commissioning. Based on this information, the local device determines the relative order of the process device within a process flow, and may determine a process element alignment map indicating the activation order of a plurality of process elements within the flow. A user may modify the map at the local device. The map is transmitted to a process control big data network for use in discovery and learning analytics. The device-specific information and/or the map may be utilized to generate, at the local device, representations/views of the process flow, which may include real-time operational data. A user may zoom in or out on these views for more or less detail.

22 Claims, 20 Drawing Sheets

(58) Field of Classification Search
CPC ......... H01L 22/12; H01L 22/20; H01L 22/34; H01L 23/544; G01N 21/9501
USPC ........... 438/16, 17, 696, 714, 419, 420, 427; 700/7, 17, 20, 47, 95, 12
See application file for complete search history.

(56) References Cited

U.S. PATENT DOCUMENTS

| | | | | |
|---|---|---|---|---|
| 7,760,905 | B2* | 7/2010 | Rhoads | G06F 3/017 382/100 |
| 8,676,219 | B2* | 3/2014 | Pratt, Jr. | G01D 21/00 370/389 |
| 9,065,813 | B2* | 6/2015 | Kolavennu | H04L 69/08 |
| 2003/0061295 | A1 | 3/2003 | Oberg et al. | |
| 2008/0109098 | A1 | 5/2008 | Moshier et al. | |
| 2008/0122641 | A1 | 5/2008 | Amidi | |
| 2008/0274766 | A1* | 11/2008 | Pratt | G01D 21/00 455/552.1 |
| 2008/0279155 | A1 | 11/2008 | Pratt, Jr. et al. | |
| 2009/0010204 | A1 | 1/2009 | Pratt, Jr. et al. | |
| 2010/0036511 | A1* | 2/2010 | Dongare | G05B 19/409 700/83 |
| 2010/0145476 | A1* | 6/2010 | Junk | G05B 19/042 700/7 |
| 2010/0272093 | A1 | 10/2010 | Raravi et al. | |
| 2010/0290351 | A1* | 11/2010 | Toepke | G05B 19/4185 370/250 |
| 2012/0075412 | A1* | 3/2012 | Miyamoto | G03B 35/00 348/36 |
| 2012/0236768 | A1* | 9/2012 | Kolavennu | H04W 76/023 370/310 |
| 2014/0197745 | A1 | 7/2014 | Agrawal | |
| 2014/0250153 | A1 | 9/2014 | Nixon et al. | |
| 2014/0277604 | A1 | 9/2014 | Nixon et al. | |
| 2014/0277656 | A1 | 9/2014 | Nixon et al. | |
| 2015/0339822 | A1* | 11/2015 | Onda | G06T 7/0028 382/128 |

FOREIGN PATENT DOCUMENTS

| | | |
|---|---|---|
| JP | 2009-140855 A | 6/2009 |
| WO | WO-2012/014008 A1 | 2/2012 |
| WO | WO-2012/129043 A2 | 9/2012 |
| WO | WO-2014/138628 A1 | 9/2014 |
| WO | WO-2015/098364 A1 | 7/2015 |

OTHER PUBLICATIONS

Mobile Plant Asset Management with Field Xpert SFX350, Endress+Hauser, 2014, http://www.us.endress.com/en/Tailor-made-field-instrumentation/System-Components-Recorder-Data-Manager/device-configurator-fieldxped-sfx350, 5 pages.
Search Report for Application No. GB1215237.7, dated Dec. 5, 2012.
"Using GPS Indoors" Bapco Journal, Bapco, 2011, Aug. 18, 2005, http://www.bapcojournal.com/news/fullstory.php/aid/30/Using_GPS_indoors.html, 4 pages.
U.S. Appl. No. 14/212,411, filed Mar. 14, 2014.
U.S. Appl. No. 14/507,188, filed Oct. 6, 2014.
Search Report for Application No. GB1600432.7, dated Jul. 7, 2016.

\* cited by examiner

150

155a  155b  155c  155d

| AREA | VESSEL/LINE | TAG | OTHER INFO |
|---|---|---|---|
| SURGE TANK 162a | PIPE 132 | LT307 | |
| | | LV307 | |
| | TANK 118 | TI118 | |
| | PIPE 135 | | |
| SPLITTER | | LT308 | TO STREAM A STREAM B |
| | | LV308 | |

| STREAM A |||| STREAM B ||||
|---|---|---|---|---|---|---|---|
| AREA | VESSEL/LINE | TAG | OTHER | AREA | VESSEL/LINE | TAG | OTHER |
| SPRAY DRYER TOWER 1 162b | PIPE 138a | | | SPRAY DRYER TOWER 1 162c | PIPE 138b | | |
| | VSD1 | | | | VSD3 | | |
| | PUMP 139a | FT310 FY310 PT311 | | | PUMP 139b | FT320 FY320 PT321 | |
| | PUMP 140a | | | | PUMP 140a | | |
| | TOWER 120a | TI120a | | | TOWER 120a | TI120a | |

*FIG. 2A*

| | | | |
|---|---|---|---|
| Area: Reaction Unit: Boiler 1 | | | |
| Tag | Manufacture | Model Number | |
| 332a —FT310 | Rosemount | 8700 |  |
| 332b —PT330 | Rosemount | 3051T |  |
| 332c —LT345 | Rosemount | 5400 |  |
| 332d —LV345 | Baumann | 24548 |  |

COMMISSIONING FIELD DEVICES IN A PROCESS CONTROL SYSTEM SUPPORTED BY BIG DATA

CROSS REFERENCE TO RELATED APPLICATIONS

The present disclosure is related to U.S. patent application Ser. No. 13/784,041, entitled "BIG DATA IN PROCESS CONTROL SYSTEMS" and filed Mar. 4, 2013; U.S. patent application Ser. No. 14/174,413, entitled "COLLECTING AND DELIVERING DATA TO A BIG DATA MACHINE IN A PROCESS CONTROL SYSTEM" and filed Feb. 6, 2014; U.S. patent application Ser. No. 14/212,493, entitled "DISTRIBUTED BIG DATA IN A PROCESS CONTROL SYSTEM" and filed on Mar. 14, 2014; U.S. patent application Ser. No. 14/212,411, entitled "DETERMINING ASSOCIATIONS AND ALIGNMENTS OF PROCESS ELEMENTS AND MEASUREMENTS IN A PROCESS" and filed Mar. 14, 2014; and U.S. patent application Ser. No. 14/507,188 and entitled "REGIONAL BIG DATA IN PROCESS CONTROL SYSTEMS" and filed Oct. 6, 2014, the entire disclosures of each of which are hereby expressly incorporated by reference.

TECHNICAL FIELD

The present disclosure relates generally to process plants and to process control systems, and more particularly, to determining process element alignment in process plants and process control systems.

BACKGROUND

Distributed process control systems, like those used in chemical, petroleum, industrial or other process plants, typically include one or more process controllers communicatively coupled to one or more field devices via analog, digital or combined analog/digital buses, or via a wireless communication link or network. The field devices, which may be, for example, valves, valve positioners, switches and transmitters (e.g., temperature, pressure, level and flow rate sensors), are located within the process environment and generally perform physical or process control functions such as opening or closing valves, measuring process parameters, etc. to control one or more process executing within the process plant or system. Smart field devices, such as the field devices conforming to the well-known Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system. For example, the controllers and the field devices control at least a portion of a process being controlled by the process plant or system.

Information from the field devices and the controller is usually made available over a data highway or communication network to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths. The protocol or protocols used by the data highway may include any one or more process control network communication protocols, such as HART, WirelessHART, Fieldbus, Profibus, HART, 4-20 mA loops, and the like, and/or may include one or more general-purpose communication protocols, such as Ethernet or Wi-Fi.

As an example, the DeltaV™ control system, sold by Emerson Process Management, includes multiple applications stored within and executed by different devices located at diverse places within a process plant. A configuration application, which resides in one or more workstations or computing devices, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

In a process plant or process control system, when evidence of an abnormal condition or fault occurs (e.g., when an alarm is generated, or when a process measurement or actuator is found to have excessive variation), an operator, instrument technician or process engineer typically uses an analytics tool in combination with his or her knowledge of the process being controlled by the system and its flow path through the system to attempt to determine upstream measurements and process variables that may have contributed to the production of the evidence of the abnormal condition or fault. For example, an operator may use the DeltaV™ batch analytics product or another continuous data analytics tool to attempt to determine the contributions of various process variables and/or measurements to an abnormal or fault condition. Typically, an operator or user identifies candidate upstream factors (e.g., measurements, process variables, etc.) based on his or her knowledge of the process and provides these candidates to the analytics tool. Subsequently, these data analytics tools utilize principal component analysis (PCA) to determine which of the candidate upstream factors impact downstream predicted quality parameters. The process control systems that are currently commercially available typically do not provide information on the flow path through the process and associated measurements and actuators along this path, and instead rely on a human to input this information into analytics tools. Consequently, as the set of candidates that is input into the tool is filtered by a person, the list of candidates may be incomplete and/or erroneous, and may not be consistent from person to person.

Additionally, the architecture of currently known process control plants and process control systems is strongly influenced by limited controller and device memory, communications bandwidth and controller and device processor capability. For example, in currently known process control system architectures, the use of dynamic and static non-volatile memory in the controller is usually minimized or, at the least, managed carefully. As a result, during system configuration (e.g., a priori), a user typically must choose which data in the controller is to be archived or saved, the frequency at which it will be saved, and whether or not compression is used, and the controller is accordingly configured with this limited set of data rules. Consequently, data which could be useful in troubleshooting and process analysis is often not archived, and if it is collected, the useful information may have been lost due to data compression.

The limitations of currently known process plants and process control systems discussed above and other limitations may undesirably manifest themselves in the operation and optimization of process plants or process control systems, for instance, during plant operations, trouble shooting, and/or predictive modeling. For example, such limitations force cumbersome and lengthy work flows that must be performed in order to obtain data for troubleshooting and generating updated models, and even then, the troubleshooting results and models may be incomplete or not fully representative of the actual system, as the inputs to their generation rely on a particular operator's experience and knowledge.

"Big data" generally refers to a collection of one or more data sets that are so large or complex that traditional database management tools and/or data processing applications (e.g., relational databases and desktop statistic packages) are not able to manage the data sets within a tolerable amount of time. Typically, applications that use big data are transactional and end-user directed or focused. For example, web search engines, social media applications, marketing applications and retail applications may use and manipulate big data. Big data may be supported by a distributed database which allows the parallel processing capability of modern multi-process, multi-core servers to be fully utilized.

SUMMARY

Techniques, systems, apparatuses, and methods for determining process element alignment in a process that is controlled by or that is to be controlled by a process plant include obtaining, at a local device in conjunction with commissioning a field device installed in the process plant, identification information of the field device and an indication of a relative process order of the field device with respect to another process device that is used or that is to be used to control the process in the process plant. The identification information and the indication of the relative process order of the field device are provided for use in generating a process element alignment map of the process.

Techniques, systems, apparatuses, and methods for aligning process elements in a process include a memory storing respective data for each field device included in a plurality of field devices for controlling at least a portion of the process in a process plant, where the respective data for the each field device includes respective identification information of the each field device and a respective indication of a relative order of the each field device with respect to at least one other field device within a flow of the process. Further, the techniques, systems, apparatuses, and methods for aligning process elements include an alignment generator configured to generate, based on the stored respective data of the plurality of field devices, a representation of an order of the plurality of field devices within the flow of the process, where the generated representation is at least a portion of a process element alignment map of the process. Still further, the techniques, systems, apparatuses, and methods for aligning process elements include a communicative connection to a display on which the at least the portion of the process element alignment map is presented.

Techniques, systems, apparatuses, and methods for determining process element alignment in a process include obtaining, from a local device used to commission field devices installed in a process plant, respective identification information and indications of respective relative orders of a plurality of field devices within a flow of the process that is controlled by or that is to be controlled by the process plant; and generating, based on the obtained respective identification information and the obtained indications of the respective relative orders of the plurality of field devices, at least a portion of a process element alignment map of the process, where the at least the portion of the process element alignment map includes an indication of an order of the plurality of field devices within a flow of the process. Additionally, the techniques, systems, apparatuses, and methods for determining process element alignment includes presenting a pictorial representation of the at least the portion of the process element alignment map on a display, where the pictorial representation indicates the process flow through the plurality of field devices.

BRIEF DESCRIPTION OF THE DRAWINGS

FIGS. 2A-2C each illustrates a different example format for presenting at least a portion of a process element alignment map of a process;

DETAILED DESCRIPTION

Figure 1:
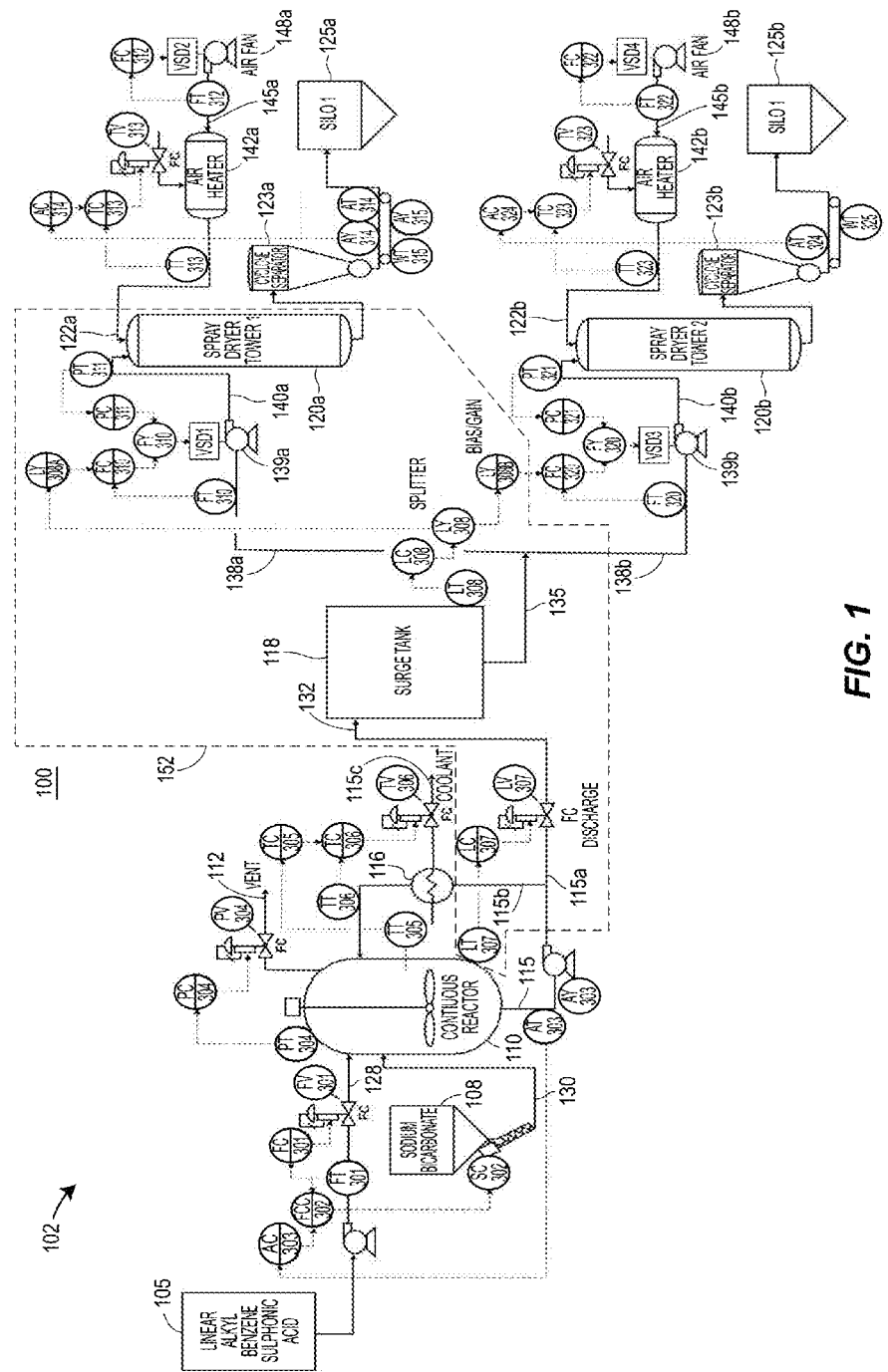
FIG. 1 illustrates an example set of primary process elements used to control an example process in a process plant or process control system.

Techniques, systems, and methods for determining the alignment, within a process in a process plant, of process elements that are used (or that are to be used) to control the process are disclosed herein. Generally, said techniques, systems and methods determine or define a process flow path or process element alignment map of the process using data or information obtained during the commissioning of the process elements.

In currently known process control plants and systems, when evidence of an abnormal condition, variation or fault at a particular process element (e.g., a process device, a process variable, or a process measurement) occurs, typically an operator, instrument technician, or process engineer uses an analytics tool in combination with his or her knowledge of the process being controlled by the system to attempt to determine upstream measurements and process variables that may have contributed to the production of the evidence of the abnormal condition, variation or fault. Upon being alerted to the abnormal condition (e.g., by an alert or an alarm), an operator attempts to determine the cause of this condition by using an analytics tool and indications of measurements and/or process variables that he or she feels may be contributing to this condition. The analytics tool performs an analysis to determine the relative effects of the input measurements and/or process variables on the abnormal behavior of the particular or target process element, and the analytics tool provides information regarding the relative effects of the operator-indicated process elements to the operator so that he or she can further investigate the condition.

This approach may suffer from incompleteness, as well as from being cumbersome and requiring a relatively large amount of time to execute. For example, this approach is dependent on the particular operator's knowledge of the process, which may or may not be complete, thorough, or accurate. Accordingly, the information generated by the analytics tool may not reflect the actual source of the variation, and can be maximally only as accurate or correct as the data which was input by the operator.

On the other hand, recent techniques for determining comprehensive and accurate process element alignment maps have been developed, such as those disclosed in aforementioned U.S. patent application Ser. No. 14/212,411. Indeed, any number of the techniques disclosed herein may operate in conjunction with any number of the techniques disclosed in aforementioned U.S. patent application Ser. No. 14/212,411, and in particular, with those techniques corresponding to generating and utilizing process element alignment maps. Generally, process element alignment maps indicate all process elements (e.g., a complete or comprehensive set of process variables, process measurements, process devices and/or other process elements) that have an active role during run-time to control the process during normal operations, e.g., by taking a measurement, performing a physical function or causing another element to perform a physical function, controlling a variable, providing a value to another process element to control a variable, generating dynamic data, receiving and operating on dynamic data, and the like. In an example embodiment, the complete or comprehensive set of process elements of a process being controlled by a process plant includes field devices and/or analysis results of samples taken from the process that provide measurements of process conditions, and includes field devices that are used to regulate plant operating conditions through the adjustment of flows through the process (e.g., liquid and/and or gas flows). This complete or comprehensive set of process elements having active roles in control and/or measurement of the process is generally referred to interchangeably herein as "primary sources" of process control and/or process measurement, or as "primary process elements" of the process. In the example embodiment mentioned above, for instance, each member of the set of process elements or primary process elements has an active role in measuring and/or regulating process operating conditions. For example, manipulated and measured variables (e.g., as identified by software tags, device tags, or other logical identifiers) of a control routine that have been instantiated in a particular controller are primary sources used by controllers (and, optionally, by operators) in the control of the process and as such, are indicated in the process element alignment map, whereas the user-generated configuration of the control routine is a tool used to automate the control of the process, e.g., to define the adjustment of liquid and/or gas flows through the process. In other examples, indications of physical process elements such as sensors, valves, and other field devices that have direct real-time roles in controlling (e.g., measuring and/or regulating) process operating conditions and/or indications of sampling points at which process flow materials (e.g., liquid and/or gas) may be extracted from the process flow are included in the process element alignment map as primary process elements, whereas indications of entities with auxiliary roles (e.g., tools to automate the regulation of a flow through the process, operator display views, diagnostic equipment, auxiliary piping, etc.) are excluded from the process element alignment map.

The process element alignment map may be determined, for example, during the commissioning of at least some of the process elements within the process plant. As is commonly known, physical process elements (such as valves, sensors, etc. that are to be utilized to control a process in a process plant) are installed at respective locations within the plant, e.g., in accordance with Piping and Instrumentation Diagrams (P&IDs) and/or other plans or "blueprints" of the plant layout and/or of the process layout. In addition, process elements that are sampling points at which process flow materials (e.g., liquid and/or gas) may be extracted for analysis, for example by using a sample analyzer or a laboratory, are indicated in plant documentation. After the process elements have been installed, at least some of the process elements are commissioned. For example, field devices, sampling points, and/or other elements that are able to commissioned are subject to a commissioning process. Generally, the commissioning process includes verifying the identification of each installed process element, typically by accessing data (e.g., identification, descriptive, and/or configuration information) stored on or available from the exterior of or mounted on the process element, such as data that is stored on or available from a passive or active physical tag or similar apparatus that is attached to the exterior surface of the process element, e.g., to an exterior surface of its housing, or that is mounted on or at the process element. For example, for a process element that is a sampling point, the physical tag or similar apparatus is mounted on a tap in a process line that is use to extract a liquid or gas sample at a sampling point. The data stored on such exterior tags or apparatuses typically has been entered or otherwise located on the exterior tag, e.g., by the process element or device's manufacturer, at some time prior to the installation of the process element. During commissioning, the data stored on or at the exterior tag of an installed process element is obtained and is used to verify that the installed element is expected at that installed location and has the appropriate, expected attributes/characteristics. Additionally or alternatively during commissioning, tags may be created and installed on devices and/or at sampling point locations. Typically, verification of process elements or devices during their commissioning is performed by a user operating a commissioning device (e.g., a handheld device or other computing device) which is disposed in proximity to and/or connected to the installed target process element, or to the exterior tag disposed thereon, e.g., by a wired or a wireless link. Process element or device verification during commissioning is important for safety reasons, as well as to conform to regulatory and quality requirements.

Other steps that may be included during the commissioning process of a process element may include loop integrity checks, e.g., for analog, wired field devices, and recording "as-installed" data. After a process element has been commissioned, the process element is configured and calibrated before prior to its on-line use in the process plant.

A process element alignment map is generally determined based on data or information that is indicative of characteristics of process elements (e.g., primary process elements), such as identifications, physical locations within the process plant at which the process elements have been installed, and, optionally, other descriptive information. The data indicative of process elements may be ordered to reflect a relative sequence of activation or active participation of the primary process elements while they operate to control the process during run-time, and/or to indicate an order of a flow of materials through the process plant. Thus, for each primary process element, a process element alignment map includes an indication of an order of participation or activation of that primary process element (e.g., with respect to an order of participation or activation of another primary process element) and/or an order of a flow of materials within the process plant while the process is being controlled, and these relative orders or positions within the process element alignment map may be described or indicated accordingly. Such an "order" is also referred to interchangeably herein as a "process order," and elements within the order or process order have relationships within the order or process order to with respect to each other. For example, a process element corresponding to a first valve that is controlled to release raw input materials into a tank for initial processing is ordered in the process element alignment map ahead of (e.g., is "upstream of") a process element corresponding to a second valve that is controlled to release the final product or output of the process into a holding area to await packaging. Conversely, the second valve is ordered after or is "downstream" of the first valve within the process element alignment map of the process.

To illustrate the concept of a process element alignment map of a process being controlled by a process plant or process control system, and the ordered participation of process elements included therein to control the process, FIG. 1 depicts a block diagram of primary process elements of an example process plant 100 that operates to control an example process 102 for producing powdered laundry detergent. In FIG. 1, the process elements used in controlling the process 102 are indicated by their respective software or device tags, which represented in FIG. 1 using the convention of a circle enclosing a three-digit loop number and two or three leading letters that identify the process element's function. Some device tags may also include one or more letters appended to the tag or loop number.

The example process 102 combines the raw materials linear alkyl benzene sulfonic acid 105 and sodium bicarbonate 108 in a reactor 110. The reaction produces soap, and also produces water and carbon dioxide as by-products. The chemical reaction may be represented by the expression:

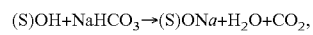

$$(S)OH+NaHCO_3 \rightarrow (S)ONa+H_2O+CO_2,$$

where (S) is the sulfonate group $HSO_2$. The carbon dioxide by-product is vented 112 from the reactor 110, and at least a portion 115a of the reactor discharge (which includes both soap and water) is transferred to a surge tank 118 for temporary storage. The surge tank 118 may be sized to serve as a buffer between different sections of the process plant 100, one section of which performs the chemical reaction in the reactor 110, and another section that processes the output of the chemical reaction in spray dryer towers 120a, 120b.

In the latter section of the process plant 100, the reactor discharge 135 stored in the surge tank 118 is sprayed 140a, 140b into the tops of one or both of the spray dryer towers 120a, 120b. As the discharge particles fall down the length of the towers 120a, 120b, the particles are exposed to respective hot streams of air 122a, 122b that cause moisture to be removed from the particles. The drier particles settle at the bottom of the spray dryer towers 120a, 120b and are separated, e.g., by using cyclone separators 123a, 123b. In the example process plant 100, any residual moisture remaining in the separated particles is detected and/or quantified for quality control, safety, and/or process control purposes. For example, residual moisture remaining in the particles after separation 123a, 123b may be detected respectively by weight sensors WT315 and WT325, and/or by moisture sensors AT314 and AT324. The separated particles, e.g., the powdered laundry detergent end-product produced by the process 102, are collected and stored in silos 125*a*, 125*b*, from which the end-product will eventually removed for packaging (not shown).

As shown in FIG. 1, at various points along the process element alignment map of the process 102, controllers execute respective algorithms to control respective portions of the overall process 102. For example, with regard to portions of the process 102 corresponding to the reactor 110, the loop 301 adjusts the flow rate 128 of linear alkyl benzene sulfonic acid 105 into the reactor 110. Specifically, in the loop 301, a controller FC301 (e.g., a flow controller) executes a respective control algorithm to control a valve FV301 to adjust the input flow rate 128, and a measurement device or sensor FT301 determines the output flow rate from the pump connected to the acid source 105, and provides an indication of the flow rate to the controller FC301 to use as an input to the control algorithm to determine the adjustment of the valve FV301. Another loop 302 controls the amount of sodium bicarbonate 130 provided to the reactor 110. Specifically, in the loop 302, a controller FFC302 executes a respective control algorithm to control the input amount of sodium bicarbonate based on the detected, measured, or sensed stream FT301 of the sulfonic acid and based on a detection, measurement, or sensing AT303 of any residual solids that are leftover from the reaction, e.g., solids that were not utilized in the reaction. The occurrence of residual solids may be caused by, for example, differing concentrations across different stocks or lots of input materials 105, 108.

With further regard to portions of the process 102 corresponding to the reactor 110, in the loop 304, a controller PC304 controls a valve PV304 to vent 112 the by-product carbon dioxide from the reactor 110. The controller PC304 adjusts the valve PV304 to vent more or less carbon dioxide based on a pressure of the reactor 110, e.g., as detected by pressure sensor PT304. Additionally, in the loop 307, an amount or level of reactants contained within the reactor 110 is controlled. For instance, a controller LC307 adjusts a valve LV307 based on a level or amount of reactants in the reactor 110, e.g., as measured or detected by sensor LT307, to change the flow rate of reactor discharge 132 (e.g., the soap and the water produced by the chemical reaction) into the surge tank 118, thus changing the level of reactants contained within the reactor 110. For example, if the level of reactants measured by sensor LT307 rises above a predetermined level, the controller LC307 may adjust the valve LV307 to increase the flow of reactor discharge 132 into the surge tank 118.

Further, the loops 305 and 306 allow the process 102 to monitor the temperature of the reactor discharge 115 as compared with the temperature of the reactants currently contained within the reactor 110. For example, the sensor TT305 measures the temperature of the reactants currently contained within the reactor, and the sensor TT306 measures a temperature of a portion 115*b* of the reactor discharge 115. Based on these temperatures, controller TC306 works in combination with controller TC305 to regulate a valve TV306 to determine the flow of cooling water through the a heat exchanger 116 to cool the reactor discharge 115*b* recirculated back to the reactor 110.

Turning now to the surge tank 118, in the loop 308, a sensor LT308 measures a level of reactor discharge contained within the tank 118, and based on the measured level, a controller LC308 manipulates the target value of a splitter LY308 to set a respective target flow rate in each of flow controllers FC310 and FC 320 needed to maintain a balance in the flow into and out of the surge tank 118, and in particular, to control the output of the surge tank reactor discharge 135 across two spray dryer towers 120*a*, 120*b*. To allow the operator to manually set the flow rate to either or both spray dryers 120*a*, 120*b*, bias/gain stations LY308A and LY308B are provided after the splitter LY308 and before the controllers FC310 and FC320, and the bias/gain stations LY308A and LY308B control respective streams of reactor discharge 138*a*, 138*b* provided to the dryers 120*a*, 120*b* and included in the loop 308.

With specific regard to the spray dryer tower 120*a*, in the loop 310, the controller FC310 adjusts the flow rate of the reactor discharge spray 140*a* into the top of the tower 120*a* by executing a respective control algorithm that controls a variable speed drive VSD1 connected to a pump 139*a*. As discussed above, controller FC310 receives an indication of a desired or target portion of the surge tank reactor discharge 135 (e.g., as indicated by LY308A) that is to be provided to the tower 120*a*, and utilizes this target or setpoint LY308A in combination with an actual detected, measured, or sensed portion 138*a* of the surge tank output 135 (e.g., as detected by sensor FT310) to determine a suitable control signal to provide to the VSD1 for controlling the pump 139*a*.

With further regard to control of portions of the process 102 that correspond to the spray dryer tower 120*a*, in the loop 313, a controller TC313 executes a respective control algorithm to control an air heater 142*a* (e.g., a gas air heater or other suitable type of heater) to vary the temperature of the hot air stream 122*a* into the tower 120*a*. As shown in FIG. 1, the control algorithm executed by controller TC313 receives, as inputs, an indication of a target temperature provided by AC314 based on the quantity of detected moisture included in the end-product (e.g., a quantity or ratio of detected moisture as detected by sensor AT314) and an indication of a temperature of an actual, real-time flow of hot air 122*a* into the tower 120*a* (e.g., as detected by sensor TT313). Based on the received inputs, the controller TC313 adjusts an amount of gas, fuel or other energy provided to the heater 142*a* (e.g., by controlling valve TV313), thus controlling the actual temperature of the hot air 122*a* generated by the heater 142*a* and provided to the tower 120*a*. In another loop 312, another controller FC312 executes a respective control algorithm to control a variable speed drive VSD2 to adjust the volume of air 145*a* provided to the air heater 142*a*. For example, based on a measured actual volume of air generated by an air fan 148*a* (e.g., as detected by sensor FT312) and based on a target flow rate (not shown) set by an operator based on the liquid flow rate 140 to the dryer 122*a*, the controller FC312 determines an adjustment to control the volume of air provided by the air fan 148*a* to the heater 142*a*, and provides an indication of this adjustment to the variable speed driver VSD2. The target flow rate may be configured into the control algorithm executed by the controller FC312, or may be provided to the controller FC312 as an additional input, either manually or automatically (not shown).

Occasionally, the spray nozzles used in the dryer tower 120*a* may become than optimally operable. For example, the spray nozzles may become partially plugged, thereby increasing the pressure needed to maintain a target flow rate to the tower 120*a*. To avoid operating at a high pressure (e.g., which may produce too fine of a spray particle size or have some other undesirable artifact), the loop 311 is used to sense a pressure of the spray tower 120*a*, e.g., by using pressure sensor PT311 and providing the sensed pressure as an input to a controller PC311. The controller PC311 executes a respective control algorithm which will send a signal to override the control signal to the driver VSD1 that drives the pump 139a when the pressure exceeds the target value specified in PC311. In an example, the control selector FY310 always selects the signal generated by the controller PC311 whenever the signal is provided by the controller PC311. Additionally or alternatively, the controller PC311 output value may send an override signal to the control selector FY310 when the sensed pressure reaches a particular threshold (and in some cases, has been sustained at this threshold over a defined duration of time. The control selector FY310 selects the VSD1 control signal generated by controller FC310 or the override signal generated by the controller PC311, and provides an indication of the selected input to the variable speed drive VSD1 to control the flow of reactor discharge 140a provided to the spray dryer tower 120a. For example, the control selector FY310 may default to providing the flow control signal generated by controller FC310 to the drive VSD1, and may switch to providing the override signal generated by the controller PC311 to the drive VSD1 when the override signal is generated, when the override signal is above or below a certain threshold, and/or when the override signal has been above or below the threshold for a predetermined amount of time. In some situations, the control selector FY310 may cause an alarm or other alert to be generated. In some embodiments, the control selector FY310 may cause the splitter LY308, LY308A, LY308B to divert a higher (or lower) proportion of the surge tank output 135 to the other spray tower 120b.

It is noted that while the above discussion focuses primarily on the spray dryer tower 120a, the spray dryer tower 120b includes controllers, sensors, and other equipment and entities similar to those discussed for the spray dryer tower 120a, and may operate in a similar manner as the spray dryer tower 120a. In FIG. 1, the equipment and other entities corresponding to spray dryer tower 120b are denoted by the same reference numbers as used for the spray dryer tower 120a, but said reference numbers are appended with a "b" suffix instead of an "a" suffix.

In view of the above, the process element alignment map of the process 102 as shown in FIG. 1 generally occurs, moves, flows, or is ordered from left to right, e.g., from obtaining the input raw materials from sources 105, 108, to processing the raw materials in the reactor 110, to processing the reacted materials in the spray dryer towers 120a, 120b, to storing the end product 125a, 125b. Accordingly, terms that indicate the relative orders of the process elements that actively participate in controlling the process 102 in real-time are used herein. As an example, as used herein, the term "upstream process elements" refers to primary process elements that generally have an earlier, active participation in controlling the process in real-time, and the term "downstream process elements" refers to primary process elements that generally have a later, active participation in controlling the process. For instance, combining the reactants 105, 108 in the reactor 110 occurs upstream of drying the reactor discharge 135 in the spray dryer towers 120a, 120b. As such, the process elements participating in controlling the release of reactants 105, 108 into the reactor 110 (e.g., process elements AT303, FT301, FV301, PT304, PV304, TT306, TT305, TV306, LT307, LV307, LT308, and SC302) are upstream of (or ordered in front of or before) the process elements participating in controlling the rate of drying in a spray dryer tower (e.g., process elements FT310, PT311, TT313, TV313, FT312, VSD1, and VSD2 for spray dryer tower 120a). Storing the end product in the silos 125a, 125b occurs downstream of the reactor 118. Thus, the process elements AT314 and WT315 are downstream of (or ordered after) the reactor process elements in the process element alignment map.

In some cases, a relative order of a particular process element may be equivalent to the relative order of another particular process element. For example, the valve FV301 controlling the release of acid flow into the reactor 110 is ordered, in the process alignment map, adjacent to the speed/frequency process element SC302 that controls the release of sodium bicarbonate into the reactor 110.

The process element alignment map may be represented, e.g., at a user interface, in any suitable format. FIG. 2A illustrates, in an example table format 150, a portion of an example process element alignment map representation corresponding to the portion 152 of the process 102 indicated by the dashed area 152 in FIG. 1. In the embodiment shown in FIG. 2A, the flow or progression of the process 102 moves from top to bottom of the table 150, so that the process elements indicated near the top of the table 150 generally are upstream of process elements indicated near the bottom of the table 150. In other embodiments, though, the progression of the process 120 may be ordered in the table format 150 from bottom to top, from left to right, or in any other desired direction.

Specifically, the table format 150 includes an ordering or alignment of process elements by area (reference 155a), e.g., the area corresponding to the surge tank 118 is indicated as being upstream of the area corresponding to the spray dryer tower 1 (reference 120a). Within each area, the order or alignment of vessels and lines associated with the area is indicated (reference 155b) in the table 150. For example, within the area of the surge tank 118, the pipe 132 is shown as being upstream of the tank 118 which, in turn, is upstream of the pipe 135. Additionally in FIG. 2A, Streams A and B that are formed from the splitting of the output of the surge tank 118 and their respective process elements are both shown as being downstream from the surge tank area 162a. Further, for each vessel or line, an ordering or alignment of primary process elements that actively participate in controlling the process 102 is indicated (reference 155c) in the table 150, e.g., by using their respective software/device tags or defined logical identifiers. For example, the flow through the pipe 132 is controlled by the loop 307 including the process elements LT307 and LV307.

The table 150 may optionally include or provide links or references to any additional information 155d that is descriptive of a particular area 155a, vessel or line 155b, and/or process element 155c. For example, the other information 155d may include, for any primary process elements 155c that are physical devices such as valves, sensors, and other field devices, an image of the device, a model and/or serial number, and/or an indication of an absolute physical location of the physical device within the process plant (e.g., by using global positioning satellite (GPS) coordinates or other suitable location identifier).

Figure 2B:
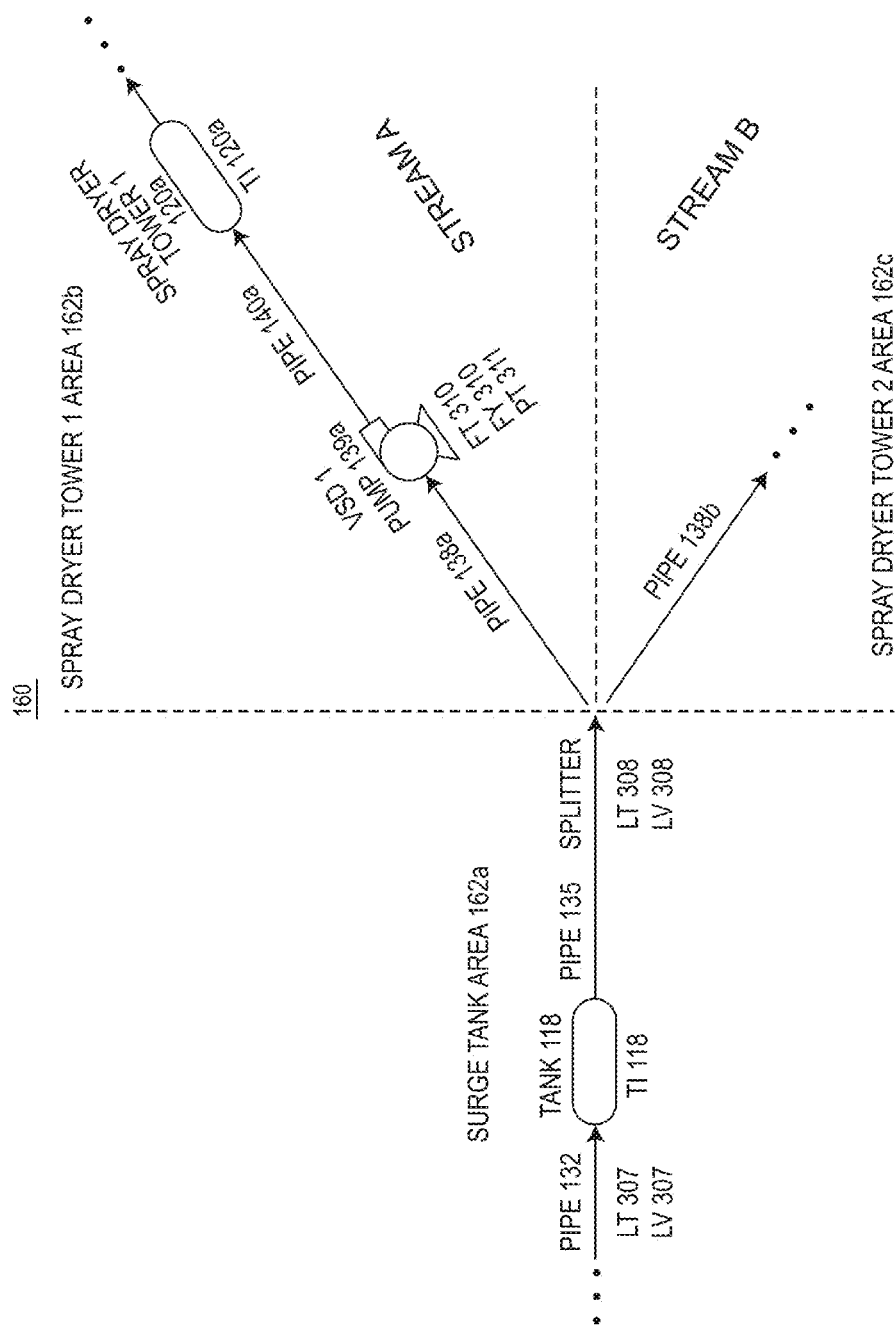

FIG. 2B illustrates, in an example graph or graphic format 160, a portion of an example process element alignment map representation corresponding to the portion 152 of the process 102. In the embodiment shown in FIG. 2B, the flow or progression of the process 102 moves from left to right, so that the process elements indicated nearer to the left of the graph 160 generally are upstream of process elements indicated nearer to the right of the graph 160. In other embodiments, though, the progression of the process 120 may be ordered from right to left, from bottom to top, or in any other desired direction. In the graph format 160, surge tank area 162a, spray dryer tower area 1 (reference 162b), and spray dryer tower area 2 (reference 162c) are separated by dashed lines and respectively labeled to indicate that the flow out of the tank 118 splits into two streams or flow paths, e.g., designated in FIG. 2B by Stream A and Stream B. Vessels and equipment are represented by graphical shapes, and lines or pipes are represented by directional vectors or lines indicating the directional flow of materials (which, in some cases, may be intermediate materials) through the controlled process 102. Identifiers of process elements that respectively are associated with or correspond to specific vessels and lines are positioned proximate to the graphic of the specific vessel or line. For example, the graph 160 indicates that, in the surge tank area 162a, intermediate materials flow through the pipe 132 to be received by the surge tank 118, and this flow of the materials into the surge tank 118 is controlled by the process elements LT307 and LV307 of the loop 307. It is understood that although graphical shapes and arrows are used as conventions in the format 160, any desired directed graph symbols and representations may be additionally or alternatively utilized in graph or graphic formats 160.

Figure 2C:
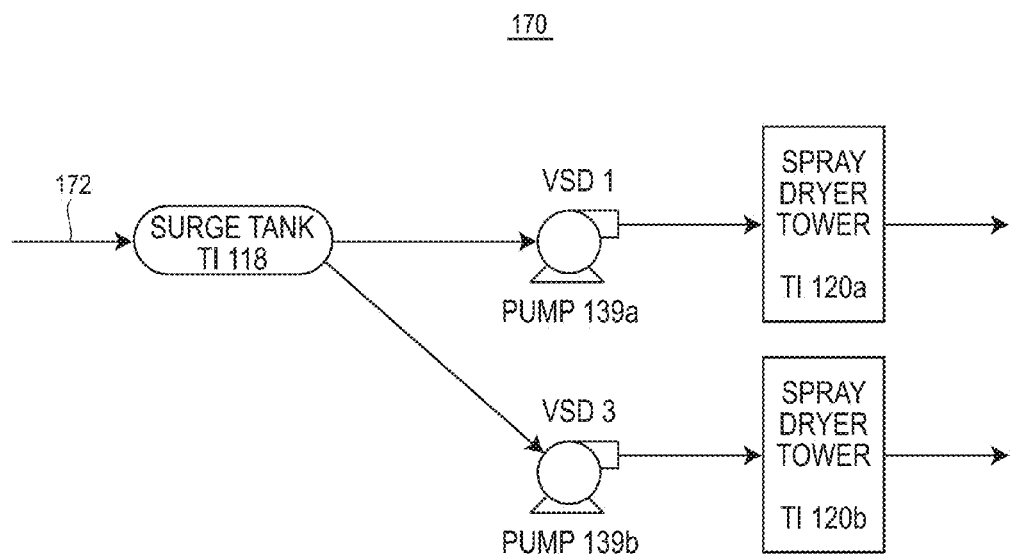

Referring to FIG. 2C, in another example format 170, nested views of a process element alignment map representation that include active links or user controls is provided on a user interface. A top or initial view 170 indicates the alignment or flow of the portion 152 of the process 102 through various areas of the process plant (e.g., from the surge tank 118 to the spray dryer tower 1 (reference 120a) and to the spray dryer tower 2 (reference 120b) using graphical shapes and arrows, although any desired convention may be additionally or alternatively used to represent process elements and flows in the format 170, such as selectable text. In the example format 170, if a user selects the graphic of the line 172 and/or the surge tank 118 graphic, a subsequent view that includes details of the selected items (and optionally, surrounding items) may be displayed. For example, upon selection of the graphic of the line 172 and/or the surge tank 118 graphic of FIG. 2C, the area surge tank graphic 162a of FIG. 2B including selectable elements thereon may be displayed. If the user then selects a particular graphic or identifier included in the area surge tank graphic 162a, still additional nested information may be displayed. For example, if the user selects the identifier LT307 on the area surge tank graphic 162a of FIG. 2B, a pop-up window including an image of the physical sensor device and/or a GPS coordinate of the particular sensor within the process plant may be displayed. Additionally or alternatively, other information associated with LT307 may be displayed.

The table format 150, the graph format 160, and the nested view format 170 are only examples of possible formats in which at least portions of the process element alignment map may be presented, e.g., at a user interface. Any desired or suitable format may be utilized for presentation of some or all of the process element alignment map.

Furthermore, any desired or suitable format for storing the process element alignment map may be utilized. For example, an indication of a particular process element used for controlling the process 102 in real-time may be stored in a database (or in some other suitable data storage format) along with an indication of the relative order of the particular process element in the process alignment map to one or more other process elements used for controlling the process 102 in real-time. In some scenarios, metadata corresponding to the particular process element, such as metadata indicative of control blocks (if defined) that work with the particular process element and/or any other information corresponding to the particular process element, is also stored. For example, an image of the particular process element, an indication of its physical location within the process plant, and/or a link to these and/or other identifying or descriptive information of the particular process element may be stored as metadata corresponding to the particular process element in the process element alignment map. The process element map may be stored in any desired or suitable data storage entity or plurality thereof that is communicatively connected a communication network of the process plant. Further, as the process flow and/or process elements within the process plant are changed over time, corresponding metadata may be captured, time-stamped, and stored as historical data. Similarly, equipment hierarchy may also be captured as metadata, time-stamped, and stored as historical data. Detailed description of said storage is provided in a later section.

A learning, discovery, training, or analytics application that operates on or is applied to at least a portion of the process element alignment map may be an unsupervised application, that is, the application initiates and executes without and/or independent of any user input. For example, the unsupervised application may be a machine learning, predictive analysis, data mining, or data discovery application. Some learning, discovery, training, or analytics applications that on or are applied to at least a portion of the process element alignment map may be supervised applications, e.g., applications that are initiated by a user command, or applications for which a user provides direct user input during the execution of the application. Examples of learning, discovery, training, or analytics applications that are used on big data in process plants and process control systems and that may operate in conjunction with any or all of the methods, techniques and systems described herein are found in aforementioned U.S. patent application Ser. Nos. 13/784,041, and 14/212,493. Other examples of learning, discovery, training, or analytics applications that may operate in conjunction with any or all of the methods, techniques and systems described herein and the creation or definition thereof are found in U.S. Patent Application No. 62/060,408, filed on Oct. 6, 2014 and entitled "DATA PIPELINE FOR PROCESS CONTROL SYSTEM ANALYTICS," the entire contents of which are hereby incorporated by reference. Of course, any or all of the methods, techniques and systems described herein may additionally or alternatively operate in conjunction with other learning, discovery, training, or analytics applications.

Turning now to a discussion of process elements that have been installed in a process plant (and optionally, that are to be commissioned), such process elements typically are physical process elements such as field devices, I/O devices, sampling or sample points, controllers, and the like. For ease of discussion, the description below refers to a field device, although it is understood that any or all of the concepts described herein may easily be applied to other physical process elements, such as controllers, I/O devices, etc.

A physical tag or other physically tangible apparatus may be attached to or mounted on the exterior of the field device, e.g., by the manufacturer. These externally mounted, physical tags or apparatuses are different than the software or device tags that are utilized by a process plant to identify a particular device, such as the software/device tags that were previously described with respect to FIG. 1 (e.g., FT301, LV307, etc.). As such, for clarity of discussion herein, the terms "software tag," "device tag," and "logical tag" are used interchangeably to refer to the logical identification or identifier of a process element or device within the process plant. On the other hand, the terms "external tag," "exterior tag," and "physical tag" are used interchangeably herein to refer to a physical, tangible apparatus or object that is mounted on or otherwise attached to an exterior surface of a process element.

Figure 3:
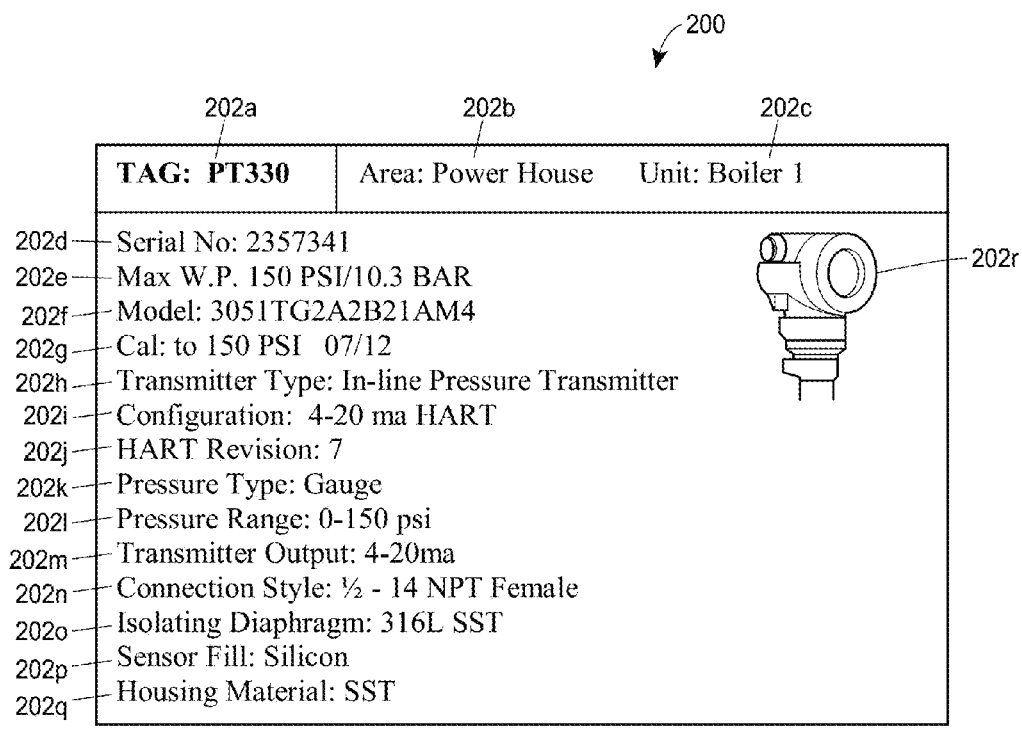
FIG. 3 illustrates example device specific information, at least some of which may be obtained during the commissioning of a process element or device.

An exterior tag that is mounted on or attached to a field device stores or includes thereon respective device specific information that generally is indicative of characteristics of the particular field device to which it is mounted or attached. For example, device specific information of a field device may include indications of a logical tag that has been assigned to the field device, the designed operating range of the device, serial number, other identification of the device, and/or other information that has been specified a priori, e.g., that was specified when the field device was ordered, or that was specified prior to the field device being installed in the process plant. Generally, the device specific information includes information that identifies or describes the field device. To illustrate, FIG. 3 includes an example of device specific information 200 that may be stored at or located on a physical tag or other apparatus that is disposed at or on an example pressure sensor field device. In FIG. 3, the device specific information 200 of the pressure sensor includes a device tag or logical tag 202a by which the sensor is identified to the process plant, an indication of an area 202b and a unit 202c in which the pressure sensor is installed, a serial number 202d, a maximum working pressure 202e, a model number 202f, a calibration indication 202g, an indication of a type of transmitter 202h of the sensor, an indication of a process control protocol or network 202i via which the sensor is able to communicate, an indication of a revision or release of the protocol 202j, a type of the pressure sensor 202k, a pressure range 202l, an output protocol or network of the sensor's transmitter 202m, a style of a connector of the sensor 202n, a type of diaphragm 202o, a type of sensor fill 202p, and/or an indication of the housing material 202q. In some embodiments, an image or representation of the pressure sensor 202r is included in the device specific information 200. Of course, the device specific information 200 may additionally or alternatively include other information. For example, for a temperature sensor, a maximum temperature and a temperature range may be included in respective device specific information 200.

The exterior tag that is mounted on the field device and on which the device specific information 200 is stored may be a passive tag or an active tag. As is commonly known, passive tags typically do not include a power source, but rather draw power from a device that reads the information on passive tag. On the other hand, active tags typically use an internal power source included therein (e.g., a battery) from which to draw power so that the information stored thereon is able to be obtained.

In some embodiments, an exterior tag includes a memory in which the device specific information or data 200 is stored, and the data 200 is obtained by using a suitable wireless or wired communication protocol or interface, e.g., in an active or passive manner. For example, the data 200 stored in the memory of the exterior tag may be obtained by another device by using NFC (Near Field Communication), RFID (Radio-Frequency Identification), or other suitable type of short-range wireless interface. Alternatively, the data stored in the memory of the exterior tag is obtained by another device via a type of wireless interface that is not limited to short ranges, such as Wi-Fi or WirelessHART. In some cases, data 200 that is stored in the memory of the exterior tag is obtained by another device by using a wired connection, e.g., by using a wired process control protocol or connection, such as wired HART.

In some embodiments, rather than being stored on the memory of an exterior tag or apparatus that is mounted to the exterior of the field device, the device specific information 200 of the field device is stored on a memory that is included in the field device, e.g., a memory that is situated or disposed within a housing of the field device. In these embodiments, a processor that is also included in the field device accesses the internal memory to obtain the device specific information 200 and provide the information 200 to another device, e.g., via a wired or wireless interface.

In some embodiments, the device specific information data 200 is stored or located on the exterior tag and is obtained by another device in an optical manner. For example, the data 200 may be stored on the exterior tag using a QR (Quick Response) Code, bar code, or other suitable machine-readable optical label, and the data 200 is accessed by another device via an optical reader or scanner.

Irrespective, though, of whether the device specific information 200 is stored outside of the field device housing (e.g., on a physical tag or on a machine-readable optical label) or is stored within the field device housing (e.g., in an internal memory of the field device), the device specific information 200 of the field device is able to be obtained or accessed by another device without having to power up the field device to a level that would be necessary to utilize the field device on-line in the process plant to control the process. For example, to obtain device specific information 200 stored in an internal memory of the field device, the field device needs only to be partially powered up. In another example, to obtain device specific information 200 stored in the memory of an external tag or on an optical label, the field device does not need to be powered up at all.

Figure 4:
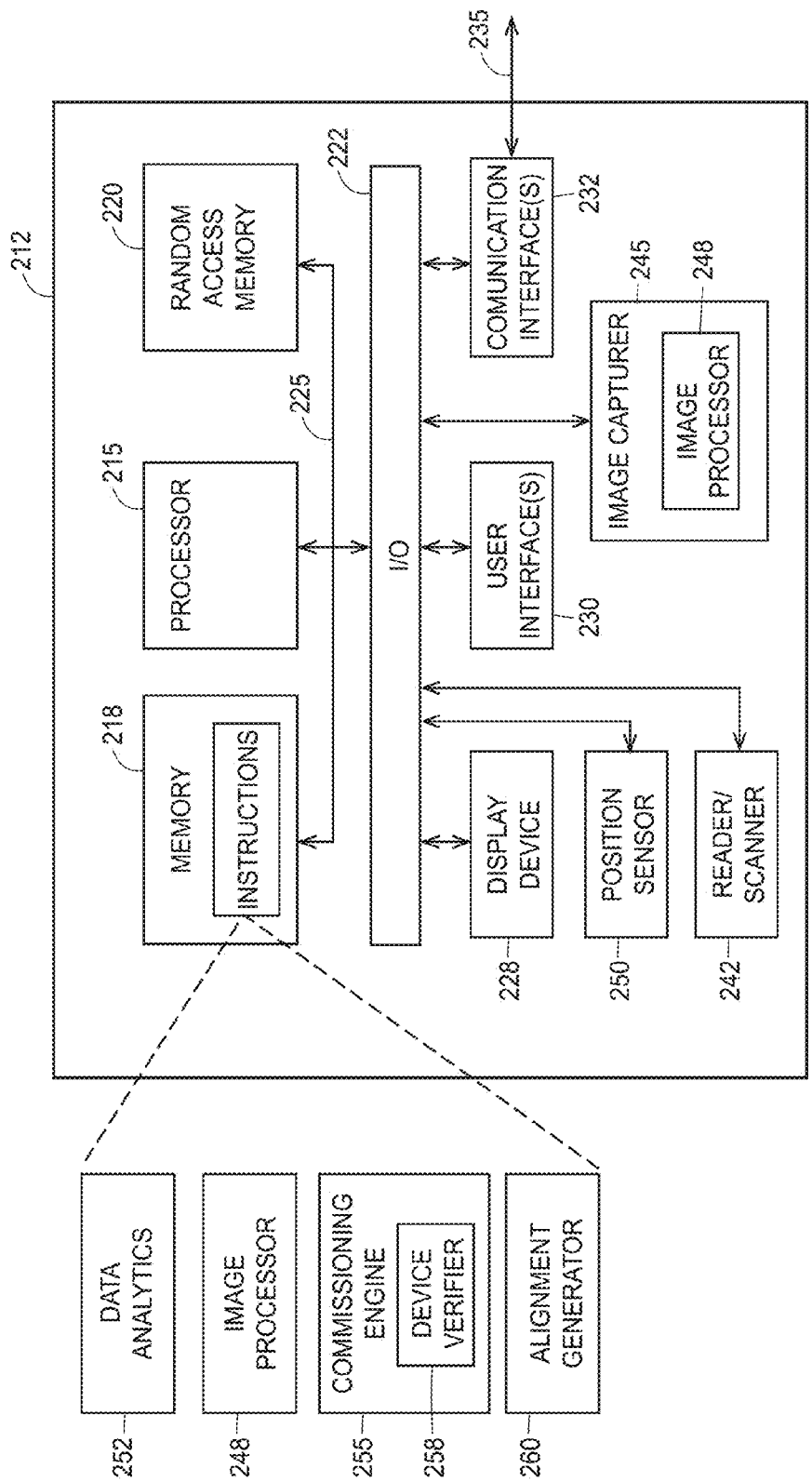
FIG. 4 includes a simplified block diagram of an example device that may be utilized to determine process element alignment.

Now turning to devices that are particularly configured to obtain or determine the device specific information 200 of the field device, FIG. 4 illustrates a simplified block diagram of an example device 212 (also referred to herein as a system or apparatus 212) that is particularly configured to obtain at least a portion of the device specific information 200 of the field device (and, of course, of the device specific information 200 of other process elements). In some situations, the device 212 is utilized to commission the field device and other process elements. The device 212 may be a computer or a computing device, or the device 212 may be another system, apparatus or device that is particularly configured to support the techniques, methods, and systems of the present disclosure, including, but not limited to, cellular telephones, smart phones, tablets or other wireless devices, personal digital assistants, media players, appliances, to name a few. For ease of discussion and not for limitation purposes, though, the device 212 is referred to herein as a computing device 212.

The example computing device 212 includes a processor 215 for executing computer executable instructions, a program memory 218 for permanently storing data related to the computer executable instructions, a random-access memory (RAM) 220 for temporarily storing data related to the computer executable instructions, and an input/output (I/O) circuit 222, all of which may be interconnected via an address/data bus 225. In some configurations, the processor 215 is a multi-core processor or processor that has co-processing capabilities (e.g., quantum, cell, chemical, photonic, bio-chemical, biological processing technologies, and/or other suitable co-processing technologies). In some configurations, the memory 218 and/or the RAM 220 are implemented using high-density memory technology, such as solid state drive memory, flash memory, semiconductor memory, optical memory, molecular memory, biological memory, or any other suitable high density memory technology. In an example configuration, the computing device 212 includes multi-core processors and/or high-density memory technology such as described in aforementioned U.S. patent application Ser. Nos. 13/784,041, 14/174,413, 14/212,493, and 14/507,188.

It should be appreciated that although only one processor 215 is shown in FIG. 4, the computing device 212 may include multiple processors 215. Similarly, the memory of the computing device 212 may include multiple RAMs (Random Access Memories) 220 and/or multiple program memories 218. The RAM(s) 220 and/or program memories 218 may be implemented as one or more semiconductor memories, flash memories, magnetically readable memories, optically readable memories, biological memories, and/or other tangible, non-transitory computer-readable storage media, for example. Additionally, although the I/O circuit 222 is shown as a single block, it should be appreciated that the I/O circuit 222 may include a number of different types of I/O circuits. For example, a first I/O circuit may correspond to a display device 228 of the device 212, and the first or a second I/O circuit may correspond to a user interface 230 of the device 212. The user interface 230 may include, for example, a keyboard, a mouse, a touch screen, a voice activation device, and/or any other known user interface device. In some embodiments, the display device 228 and the user interface 230 may be jointly incorporated in a single physical device, e.g., a touch screen.

In FIG. 4, the computing device or computing device 212 includes one or more network or communication interfaces 232 via which one or more respective links 235 to one or more respective communication or data networks are accessed. The communication interfaces 232 may include interfaces to one or more process control specific communication and/or data networks, e.g., Fieldbus, Profibus, HART, 4-20 mA loops, WirelessHART, process control big data, etc. For example, the computing device 212 includes an interface to a process control big data network, such as described in aforementioned U.S. patent application Ser. Nos. 13/784,041, 14/174,413, 14/212,493, and 14/507,188. Additionally or alternatively, the communication interfaces 232 may include one or more interfaces to general purpose communication and/or data networks, e.g., Ethernet, NFC, RFID, Wi-Fi, etc. A link 235 to a communication or data network may be as simple as a memory access function, and/or a link 235 may be a wired, wireless, or multi-stage connection. Many types of interfaces 232 and links 235 are known in the art of networking and may be used in conjunction with the computing device 212.

The computing device 212 includes one or more sets of particular computer executable instructions 240 stored thereon, and as such, the computing device 212 is particularly configured at least in part by the particular one or more sets of instructions 240 stored thereon. As used herein, the terms "computer-executable instructions," "computer executable instructions," and "instructions" are used interchangeably. As shown in FIG. 4, the instructions 240 are stored on the memory 218 and executable by the processor 215 to perform any portion or all of the methods and/or techniques described herein. The one or more sets of instructions 240 may comprise one or more engines, routines or programs, such as an image processor 248, one or more data analytics engines 252, a commissioning engine 255, an alignment generator 260, and/or other engines, routines or programs. More detailed descriptions of the engines 248, 252, 255 and 260 as well as of other possible sets instructions that may be included in the computer executable instructions 240 are described in subsequent sections.

The computing device 212 may include other elements that are communicatively coupled to the I/O circuit 222. In an embodiment, the computing device 212 includes one or more scanners or readers 242, each of which is configured to read or access device specific information or data 200 stored at the field device and at other process elements. In an example, the computing device 212 includes a read/write scanner that may obtain data stored at an active exterior tag or apparatus, data stored at a passive exterior tag or apparatus, and/or data stored on an optical label. Additionally or alternatively, the computing device 212 may include a read-only scanner to access data stored at a passive exterior tag, at an active exterior tag, and/or on an optical label. For instance, the scanner may be an NFC scanner. In some embodiments, at least a portion of a scanner/reader 242 is implemented by the processor 215, the memories 218, 220, the instructions 240 and the network interface 235, such as when the computing device 212 obtains data 200 which is stored an internal memory of the field device. The computing device 212 may include only one scanner/reader 242, or may include multiple types of scanners/readers 242.

In some embodiments, the computing device 212 includes an image capturing capability 245 (e.g., an image capturing engine or image capturer 245). The image capturing capability 245 includes a camera interface or other suitable interface via which images (e.g., digital images, which may be high resolution) are captured, and the captured images may be stored in the RAM 220. In some cases, the computing device 212 also includes one or more image processing capabilities 248 (e.g., an image processing engine or image processor 248) to operate on one or more stored images. For example, the image processor 248 may operate on multiple stored images to combine them into a single, panoramic image. Additionally, the image processor 248 may include other image processing capabilities such as feature detection, pattern recognition, filtering, transformation, etc. The image processor 248 may implemented at least in part as one of the sets of the computer executable instructions 240 stored in the memory 218 and executable by the processor 215, and/or at least a portion of the image processor 248 may be integral with the image capturer 245.

In some embodiments, the computing device 212 additionally or alternatively includes wireless positioning sensor or system 250, also referred to herein as a wireless positioner sensor or system 250. The wireless positioning sensor 250 senses or determines a current location of the computing device 212 by using wireless technology, e.g., by receiving or detecting and processing wireless beacon signals. The wireless positioning sensor 250 may use any number of suitable wireless positioning technologies, such as GPS (Global Positioning System) and/or other types of satellite navigation systems, Wi-Fi based positioning, cellular system based positioning, and/or local positioning. The current location of the computing device 212 as determined by the wireless positioning sensor 250 may be represented as an absolute location (e.g., based on geo-spatial coordinates), or may be represented as a relative location (e.g., with respect to another known location). In some embodiments, a first portion of the wireless positioning sensor 250 is implemented at least in part by a communication interface 232 (e.g., to receive the beacon signals), and another portion of the wireless portion of the wireless positioning sensor 250 is implemented at least in part by a respective portion of the computer executable instructions 240 (e.g., to process the information from the beacon signals to determine the location of the computing device 212).

In some embodiments, the computing device 212 additionally or alternatively includes one or more data analytics capabilities or engines 252 that are included in the instructions 240 and that are executable by the processor 215. Data analytics capabilities 252 may include one or more analyses that are able to be applied to stored data 220 to discover, learn, or analyze knowledge, such as those analyses previously described with respect to FIGS. 1-3. Typically, although not necessarily, when the computing device 212 includes data analytics 252, the processor 215 of the computing device 212 is a multi-core processor, at least a part of the RAM 220 includes high-density memory technology, and the computing device 212 itself may be a big data node that may be connected to a process control big data network via a respective interface 232. In an example, the computing device 212 is a big data node such as described in aforementioned U.S. patent application Ser. No. 14/507,188, and may include any number of any of the big data analytics capabilities and routines described therein. The results of the data analytics 252 may be stored locally at the computing device 212 (e.g., in the RAM 220), and/or may be transmitted to a big data storage area via the process control big data network (e.g., via a respective communication interface 232).

In embodiments in which the computing device 212 is utilized to commission process elements, the instructions 240 include a commissioning engine 255 that, when executed, operate to perform one or more commissioning actions. For example, the commissioning engine 255 includes a device verifying engine or device verifier 258 configured to verify that a particular, installed target process element is the process element that was intended to be installed at a particular location and connected to other particular process elements and/or plant equipment. In an embodiment, the device verifier 258 compares the identification and/or description information obtained from the target process element (e.g., some or all of the types of the device specific information 200 discussed with respect to FIG. 2) with a P&ID or other resource that indicates the planned layout or blueprint of the process and/or of the process plant to determine whether or not the installed process element is an expected process element. In some situations, the device verifier 258 and/or the commissioning routine 255 operates in conjunction with the display device 228 and/or the user interface 230 of the computing device 212. Of course, the commissioning engine 255 may operate to perform other commissioning actions, such as performing loop integrity checks, recording as-install data, and/or other commissioning activities, at least some of which may be performed in conjunction with user input.

In some configurations, the device 212 is further particularly configured to determine process element alignment based on at least a portion of the obtained device specific information 200 of the field device (and, of course, of the device specific information 200 of other process elements). For example, in FIG. 4, the instructions 240 of the computing device 212 include an alignment generator 260 that, when executed by the processor 215, operates to cause the computing device 212 to generate an alignment of multiple process elements within the process flow. Typically, to determine the process element alignment, the alignment generator 260 operates at least in part on descriptive data that was obtained from process elements, e.g., during their commissioning, as well as on other data indicative of relative ordering of some of the process elements. The generated process element alignment may be stored in the memory 220 of the device 212, and or the generated process element alignment may be provided to another device, such as to a big data node of a process control big data network supporting the process plant. The alignment generator 260 and its operations and the process control big network are described in more detail in subsequent sections.

Of course, although not illustrated in FIG. 4, the computing device 212 may additionally or alternatively include other sets of instructions 240 and/or other elements or components.

Figure 5:
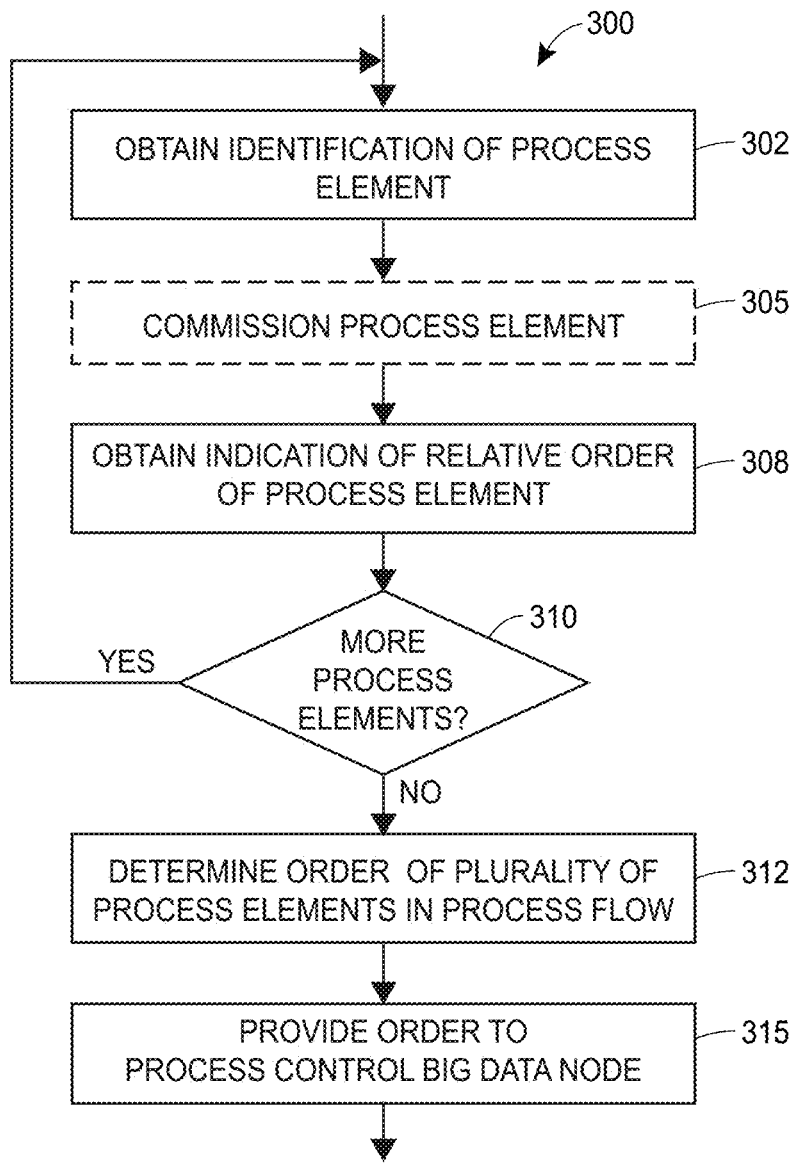
FIG. 5 includes a flow diagram of an example method for determining process element alignment.

FIG. 5 illustrates a flow diagram of an example method 300 for determining the alignment of process elements that are used (or that are to be used) to control a process in a process plant or process control system. The method 300 may operate in conjunction with any number of any of the techniques discussed with respect to FIGS. 1-4, and is discussed below with simultaneous reference thereto for illustrative but non-limiting purposes.

In an embodiment, at least a portion of the method 300 is performed by a local device that is in physical proximity to a target process element (e.g., a field device, controller, I/O device, or other physical process element). For example, at least a portion of the method 300 may be performed by a commissioning device or other device that is physically proximate to the target process element. The local device performing at least a portion of the method 300 may communicatively connect to the target process element, and/or may communicatively connect to an apparatus or physical tag mounted on the exterior of the target process element. The communicative connection between the local device and the process element and/or the apparatus or physical tag disposed on the exterior of the process element may be a wired link and/or may be a wireless link. In an example scenario, at least a portion of the method 300 is performed by the computing device 212 of FIG. 4, and the method 300 is so described below for ease of discussion. However, it is understood that some or all of the method 300 may be performed by other suitable devices, systems or apparatuses.

At block 302, the method 300 includes obtaining or determining identification information of a target process element such as a field device, controller, I/O device, or other physical process element. The determined or obtained identification information may include some or all of the types of device specific information 200 previously discussed with respect to FIG. 3, and/or may include other information that is descriptive of the target process element. As previously discussed, typically, the device specific information 200 was stored a priori (e.g., by the manufacturer or provider of the process element) at the target process element prior to the process element's arrival and/or its installation in the process plant. However, the device specific information 200 may have been stored at the target process element at any time prior to the initiation of the execution of the method 300. In an embodiment, at least some of the device specific information 200 of the process element is stored external to the target process element, e.g., on a physical tag or optical label that is attached to or mounted on the exterior of the process element. Additionally or alternatively, at least some of the device specific information 200 of the process element is stored internal to the target process element (e.g., within the housing of the target process element, such as in an internal memory). Irrespective, though, of where the device specific information 200 is stored or located at the target process element, the identification information of the process element is obtained or determined (block 302) by reading, receiving, or otherwise gaining access to the device specific information 200. In an example, the computing device 212 utilizes one or more communication interfaces 235 and/or one or more scanners/readers 242 to read, access or otherwise obtain the device specific information 200 of the target process element (block 302), such as in a manner previously discussed with respect to FIG. 4. The obtained device specific information 200 may be stored as obtained identification information, e.g., in the memory 220 of the computing device 212.

As previously mentioned, obtaining or determining identification information of a target process element (block 302) may additionally or alternatively include obtaining or determining other information that is indicative or descriptive of the target process element, other than information that is stored at or on the target process element. For example, in some situations, obtaining identification information a target process element (block 302) includes obtaining an image of the target process element, e.g., by utilizing an image capturer 245 of the computing device 212. For example, a photograph or digital image of the target process element in its installed environment is obtained by the image capturer 245. The obtained image of the target process element may be stored, e.g., in the memory 220 of the computing device 212, as obtained or determined identification information of the target process elements. Indeed, the memory 220 may be configured to store a plurality of respective device identification information 200, images, and/or other descriptive/indicative information for each of a plurality of process elements.

In an embodiment, the method 300 optionally includes commissioning the process element (block 305). Commissioning the process element (block 305) includes utilizing at least some of the obtained identification information (e.g., the logical tag 202a, the area 202b, the type 202g, etc.) to verify that the target process element is indeed the process element that is expected to be installed at that particular location, and that has the expected particular attributes and characteristics. In an embodiment, commissioning the process element (block 305) is performed by the commissioning engine 255 stored in the memory 218 of the computing or commissioning device 212, and the device verifier 258 of the commissioning engine 255 verifies that the target process element is the expected process element.

In some embodiments of the method 300, at least a portion of the blocks 302 and 305 are an integral block. For example, the identification information of the target process element may be collected (block 302) during the commissioning of the target process element (block 305).

At a block 308, the method 300 includes obtaining an indication of a relative order of the target process element. That is, the method 300 includes obtaining an indication of the relative order of the target process element, within the flow of the process, with respect to at least one other process element that is (or is to be) utilized within the flow of the process. The obtained indication of the relative order of the target process element may be stored in conjunction with the obtained identification information of the target process element, e.g., in the memory 220 of the computing device 212. Indeed, the memory 220 may be configured to store indications of a plurality of respective relative orders of a plurality of process elements within the process flow.

In some embodiments, obtaining the relative order of the target process element (block 308) includes obtaining or determining a physical location (e.g., an absolute geo-spatial location or relative physical location) at which the target process element is installed. In an example, the computing device 212, while located or disposed in proximity to the target process element, determines a current geo-spatial location using the wireless position sensor or system 250. In another example, physical coordinates indicative of the geo-spatial or physical location of the target process element are received at the computing device 212, e.g., via the user interface 230, and/or via the communication interface 232.

Additionally or alternatively, the physical location of the target process element may be determined from images or pictures. In an example scenario, while the computing device 212 is located or disposed in proximity to the target process element, a user captures an image of the target process element and at least some of the environment in which the target process element has been installed or is situated. The captured image is stored in the memory 220 of the computing device 212 along with other captured images of other process elements in the same area or environment. The image processor 248 of the computing device 212 operates on the stored images to combine them into a single panoramic image of the process plant area, which is easily accomplished when a common object or feature has been captured in more than one image, or when multiple images capture overlapping portions of the plant environment. In this scenario, relative physical positions of process elements are easily determined from the panoramic image. Additionally, in some cases, actual physical locations of process elements are able to be determined from a panoramic image. For example, an absolute physical location of at least one object or marker included in the panoramic image (which may or may not be a process element) is provided or known a priori, e.g., the absolute geo-spatial coordinates of a wall of the process plant that is shown in the panoramic image are known. Subsequently, given the known physical location of the wall and the respective positions of other objects and process elements with respect to the wall as shown on the panoramic image, the respective physical locations of other objects and process elements shown in the panoramic image are easily determined, e.g., by using the image processor 248 and/or other suitable portion of the computer-executable instructions 240.

In another example scenario, an image, map, view, or other pictorial representation of a specific area of the process plant is stored a priori at the computing device 212, or is otherwise made available to the computing device 212. The image, map, view, or other pictorial representation of the specific area of the process plant is presented on the display 228. A user selects a stored identifier or indication of a recently installed target process element (e.g., an image, a logical tag, or other device specific information that was obtained and stored at the computing device 212 at the block 302), and drags and drops (or uses another suitable selection and placement mechanism) the selected target process element identifier onto a particular position or location on the displayed image, map, view, or other pictorial representation of the specific area of the process plant, thereby indicating a relative physical location of the identified process element within the specific area of the process plant. Similar to the previously discussed embodiment, when an absolute physical location of at least one object or feature shown on the area view is known, the absolute physical locations of dragged and dropped process elements are easily determined, e.g., by using the image processor 248 or other suitable portion of the computer-executable instructions 240.

After the images of the recently installed, multiple process elements included in the specific area have been incorporated onto a view of the area of the process plant (e.g., whether by generating a panoramic view from multiple images, or by user selection and placement of images onto a provided view), a user may select, on the view, individual images of the process elements in the order of their activation within the process flow, thereby indicating the relative ordering of the selected process elements. The indication of the relative ordering may be stored, for example, in the memory 220.

Some of these concepts of the method 300 are illustrated in FIGS. 6A-6D, which include an example set of display views 320, 325. The display views 320, 325 are pictorial in nature and may be presented, for example, at the display device 228 of the computing device 212. It is noted that the pictorial display views 320, 325 may be of any suitable pictorial form, such as photographs, digital images, graphical representations, and the like. For ease of discussion, but not for limitation purposes, FIGS. 6A-6D are discussed below with simultaneous reference to FIGS. 3-5.

Figure 6A:
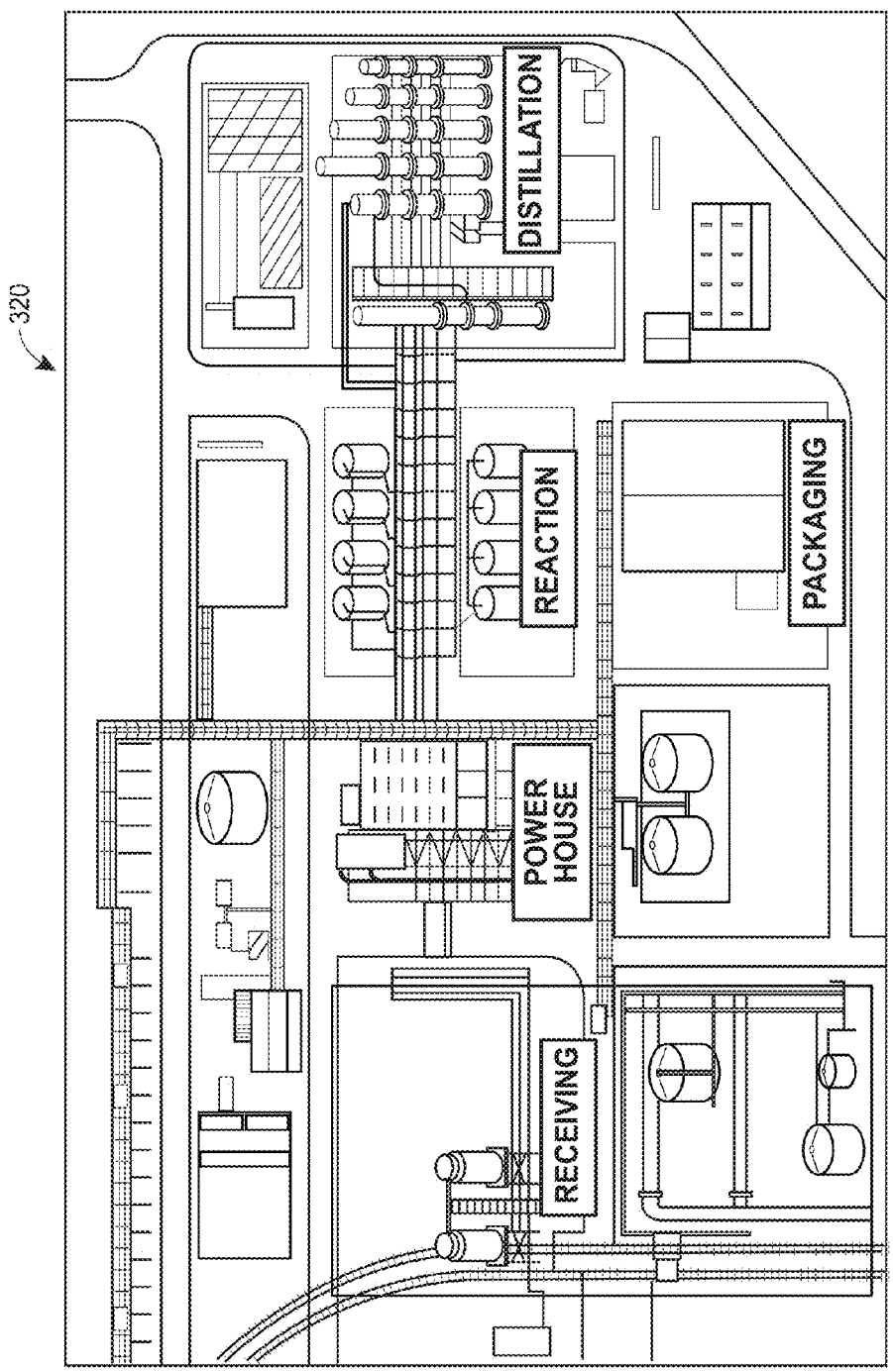
FIGS. 6A, 6B and 6D each depicts an example pictorial view of at least a portion of a process plant, where the pictorial views may be utilized to determine process element alignment.

FIG. 6A depicts an example pictorial, display view 320 of an entire process plant. The view 320 is an aerial view, and different areas of the plant are labeled (e.g., Receiving, Power House, Reaction, and Distillation). The view 320 may be stored a priori in the memory 220 of the computing device 212 or otherwise be remotely accessible, and the view 320 may be presented on the display 228 in response to a user command.

In an example scenario, the user selects or zooms in on a desired area of the plant view 320 to better see the details of the desired area. For example, on the plant view 320, the user selects the Reaction area, and consequently a more detailed view 325 of the Reaction area is presented on the display 228, such as shown in FIG. 6B.

Figure 6B:
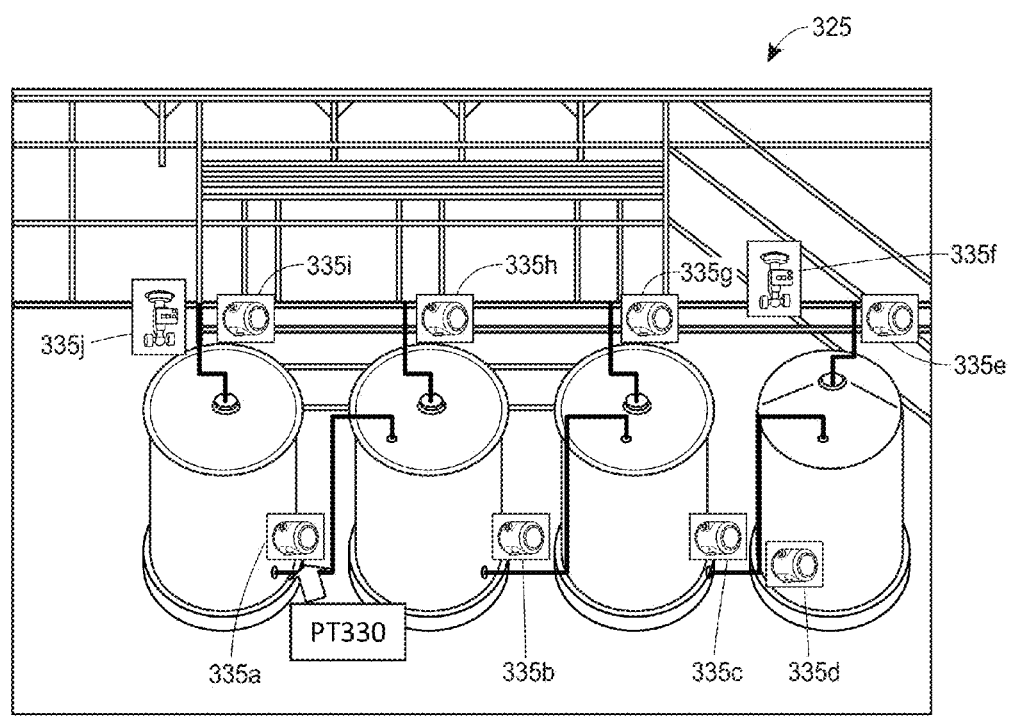
Figure 6C:
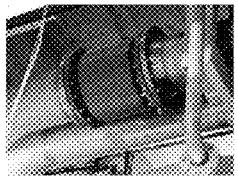
FIG. 6C depicts an example view presenting device specific information that has been obtained during the commissioning of various process elements or devices.
Figure 6C:
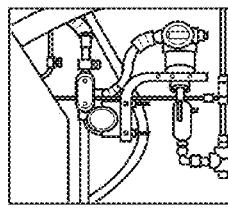
Figure 6C:
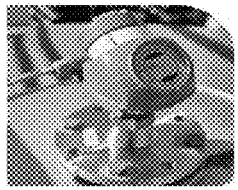
Figure 6C:
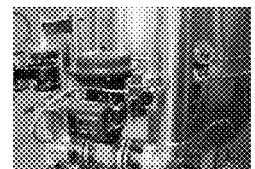
Figure 6D:
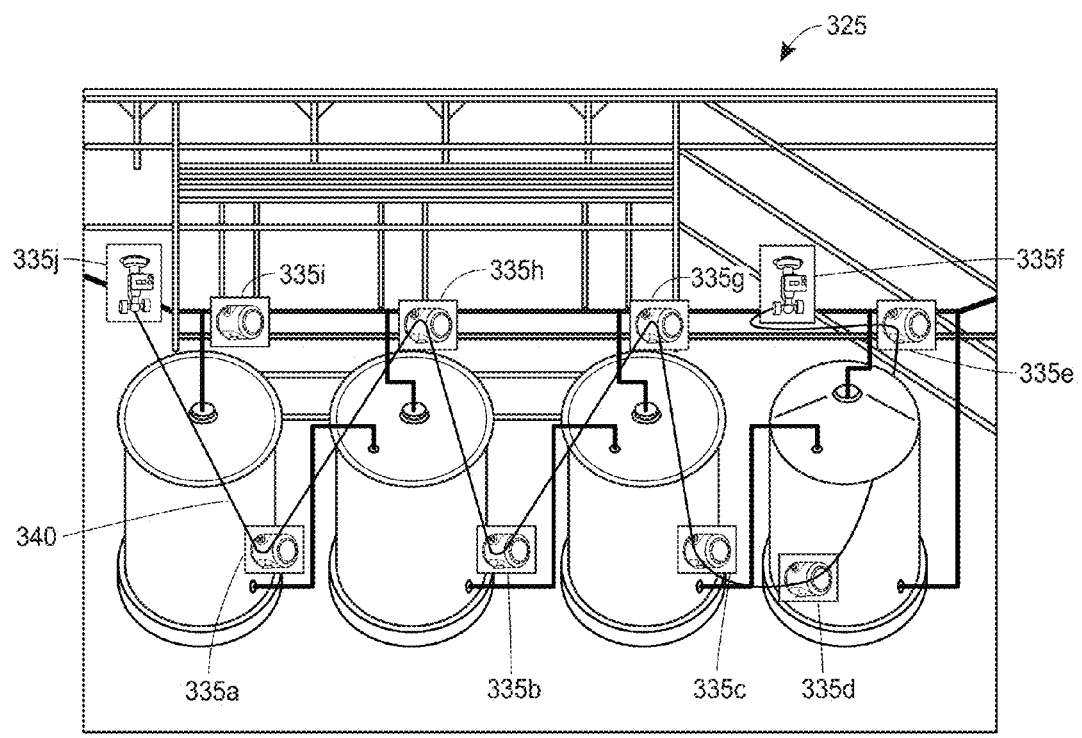

Referring now simultaneously to FIGS. 6B and 6C, and continuing with this example scenario, the user calls up (e.g., in another window on the display 228) a display view 330 on which a portion of device specific or identification information and images 332a-332d for a set of process elements is presented. As shown in FIG. 6C, the display view 330 indicates that the set of process elements has been installed (and optionally commissioned) in Boiler 1 Unit of the Reaction area of a process plant. Further, the displayed identification information 332a-332d of the set of process elements has been obtained, for example, by using any of the techniques described with respect to block 302, and has been stored at the computing device 212. In FIG. 6C, the displayed identification information 332a-332d for each process element of the set includes a logical tag, a manufacturer identity, a model number, and an image of the process element.

The user then selects one of the process elements in the display view 330, and drags and drops the selected process element at a particular position on the Reaction area view 325 to indicate the physical location of the selected process element within the Reaction area. For example, in FIG. 6B, the user has selected process element PT330 (reference 332b) from the display view 330, and has dragged/dropped the representation of the process element PT330 to a desired position 335a on the display view 325 to indicate the location of PT330 in Boiler Unit 1 of the Reaction area. Indications of other process elements 335b-335j that have been selected from the display view 330 (and from other views) and whose positions/locations in the Reaction area have been indicated by the user on the display view 325 are also shown in FIG. 6B.

Turning now to FIG. 6D which again depicts the display view 325 and the indications of the process elements 335a-335j thereon, subsequently, the user indicates the flow of the process through the process elements 335a-335j by clicking or otherwise selecting the indicated, positioned process element indications 335a-335j in the order that their corresponding process elements are activated in the process flow. For example, in FIG. 6D, the user has clicked, in the following order, process elements 335j, 335i, 335a, 335h, 335b, 335g, 335c, 335d, 335e, and 335f. The resulting flow path through the process is indicated on the Reaction view 325 (reference 340). The indicated, relative ordering of the process elements within the flow of the process may be stored, e.g., in the memory 220.

In situations in which various process elements are indicated on a generated panoramic view or image, the user may follow a similar procedure to click or select on the various process elements presented thereon in the order that the various process elements are activated in the process flow. The resulting flow path through the process may then be depicted on the panoramic view, and the corresponding, relative ordering of the process elements within the flow of the process may be stored, e.g., in the memory 220.

Returning now to the block 308 of the method 300, in some embodiments, obtaining or determining the relative order of a group of process elements (block 308) is performed simultaneously with commissioning the group of process elements (block 305), e.g., in addition to or alternatively to determining the relative order based on images or pictures. For example, during commissioning, information stored at each process element of the group of process elements (e.g., device specific information 200, images, and/or other descriptive information of each process element in the group) is scanned, read, or otherwise obtained (block 302) by the computing device 212 as part of the commissioning process of the group of process elements, e.g., in a manner such as previously discussed. As the various process elements are scanned, an indication of each scanned process element is presented on the display 228 of the computing device 212 in the order of the scanning, and the relative order of the scanned process elements may be determined or obtained during the commissioning process.

Figure 7A:
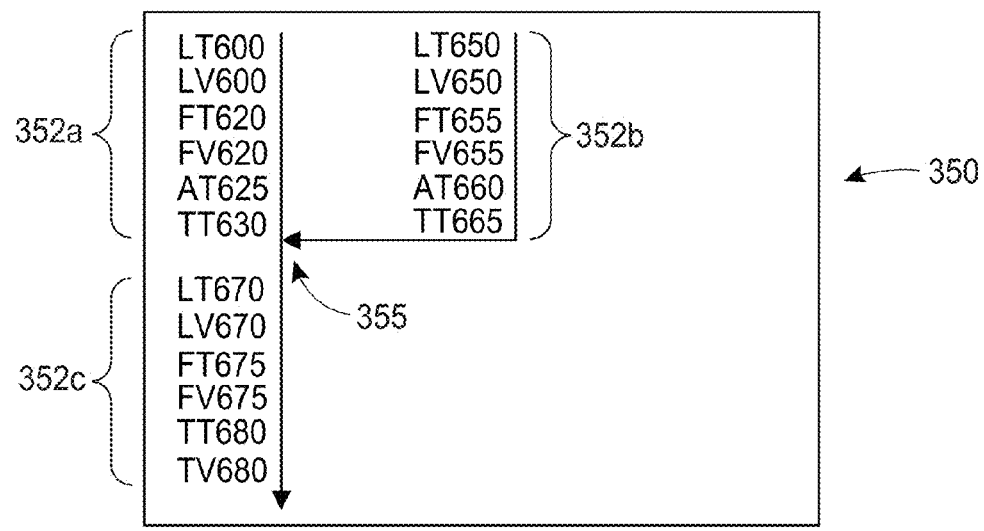
FIGS. 7A-7C each depicts an example tabular or chart view of a portion of relative locations of field devices in a process plant.

To illustrate an example scenario, FIG. 7A depicts a display view 350 on which the logical tags of various process elements are displayed in the order in which they were scanned, e.g., at the computing device 212. In contrast to the pictorial display view. 325 of FIGS. 6A-6D, the display view 350 of FIG. 7A is generally a non-pictorial representation, e.g., a textual and/or numerical representation, a table, a chart, etc. with a lesser or minimal amount of graphics as compared to FIGS. 6A-6D.

The non-pictorial or textual display view 350 shown in FIG. 7A depicts the order in which the process elements were scanned, e.g., at the computing device 212, by the positioning of their respective logical tags on the view 350. For example, first LT600 was scanned, then LV600 was scanned, then FT620 was scanned, and so on. As such, when the user scans process elements according to the order of their respective activation in the process flow, the relative order of the process elements within the process flow is obtained by virtue of the order in which the process elements are scanned. For example, in FIG. 7A, the ordering of the process elements within the process flow is depicted from the top to the bottom of the screen 350. After a set of process elements have been scanned and their scanned order is displayed, though, a user may make modifications to the display 350 if he or she desires, e.g., to correct errors, to revise the ordering, etc. The user may perform any desired modifications by dragging and dropping (or otherwise selecting and placing) indications of process elements to desired locations on the display view 350. For instance, by using drag and drop or other suitable user command, the user may switch the relative ordering of FT620 and FV620. In some embodiments, instead of or in addition to a user actively and manually directing modifications to the display view 350, modifications to the relative ordering of the process elements presented on the display 350 may be automatically determined. In an example, the alignment generator 260 of the computing device 212 compares the contents of the screen 350 with a pictorial image or representation such as the display view 325, and the alignment generator 260 adjusts the relative ordering of the indications on the display view 350 to comport with the relative ordering of the images of the process elements on the display view 325. Irrespective of whether the modifications are manually or automatically determined or generated, though, a user may indicate an approval of the presented draft modifications, after which the modifications may be applied, saved, transmitted, etc.

At the non-pictorial representation 350 of FIG. 7A, in addition to modifying the relative ordering of process elements on the display view 350, other aspects of the process elements with respect to the process as displayed on the view 350 may be manually and/or automatically modified. For example, the particular portion of the process represented on the display view 350 includes two feed streams that come together into a reactor. The two feed streams are indicated by two separate columns 352*a*, 352*b*, each of which includes indications of the respective, activation order of process elements included in the respective stream. For example, the feedstream 352*a* activates, in order within the process flow, process elements LT600, LV600, FT620, FV620, AT625 and TT630, and the feedstream 352*b* activates, in order within the process flow, process elements LT650, LV650, FT655, FV655, AT660 and TT665. The arrow 355 on the display view 350 indicates the point at which the two feedstreams 352*a*, 352*b* come together at the reactor, and indications of subsequent process elements operating within the process flow downstream of the reactor (reference 352*c*) are displayed on the view 350 in their order of activation, e.g., LT670, LV670, PT675, PV675, TT680, TV680. The point at which the streams 352*a*, 352*b* come together within the process flow may be modified or adjusted. For example, the user may select the connection point 355 and drag/drop the connection to a desired location on the display view 350 to indicate the desired point in the process flow at which the two streams 352*a*, 352*b* come together.

Additionally or alternatively, on the display view 350, a user may define a grouping of process elements that are associated with a specific piece of plant equipment. For example, referring now to FIG. 7B, the user has indicated on the display view 350 that the process elements LT670, LV670, PT675 and PV675 are associated with a particular piece of equipment, and this user-defined grouping is indicated on the display view 350 by the box 358. The user may then select or define the type of equipment 359 that corresponds to the box 358 and a corresponding logical vessel equipment tag (not shown in FIG. 7A, but which may be presented, e.g., upon selection of the "Reactor" label 359). For example, the user may indicate (as illustrated in the example view 350 shown in FIG. 7B) save it that the vessel represented by the box 358 is a reactor 359, and may provide a corresponding logical tag for the reactor, as well as other information that is indicative or descriptive of the reactor.

Indeed, a library of pre-defined equipment types, components, and graphic views may be provided to facilitate groupings of process elements. For example, a library of pre-defined vessel types (e.g., tank, reactor, distillation column, etc.) and corresponding view templates may be provided to facilitate groupings of process elements. In some cases, a piece of equipment may be defined or indicated by the user to be a composite piece of equipment that includes multiple types of other equipment. In an example, a reactor may include a tank and a heater, and the user is able to indicate this configuration on the display view 350. For example, on the display view 350 shown in FIG. 7C, the user has indicated that the process elements LT670, LV670, PT675 and PV675 are included in a tank 360, the process elements TT680 and TTTV680 are included in a heater 362, and the tank 360 and the heater 362 are included in a reactor 365, e.g., as indicated by the respective boxes shown in FIG. 7C.

Of course, the representations of user selection of process elements, their groupings and definitions discussed above for FIGS. 7A-7C are exemplary only. For example, a grouping of process elements need not be represented on the display view 350 by a box, but may instead use any suitable graphical and/or textual indication of a grouping. Further, in embodiments in which both pictorial and non-pictorial views or representations of a particular process area are provided, a change to one may automatically be reflected in the other. For example, a change in the relative ordering of process elements of a portion of the process flow shown on a tabular representation (e.g., the display view 350) may automatically be reflected on a pictorial representation of the relative ordering of the same process elements of the same portion of the process flow, and vice versa. Indeed, for a particular portion of the process, both a pictorial 325 and a non-pictorial 350 representation may be utilized or generated, only a pictorial representation 325 may be utilized or generated, only a non-pictorial representation 350 may be utilized or generated.

Figure 7B:
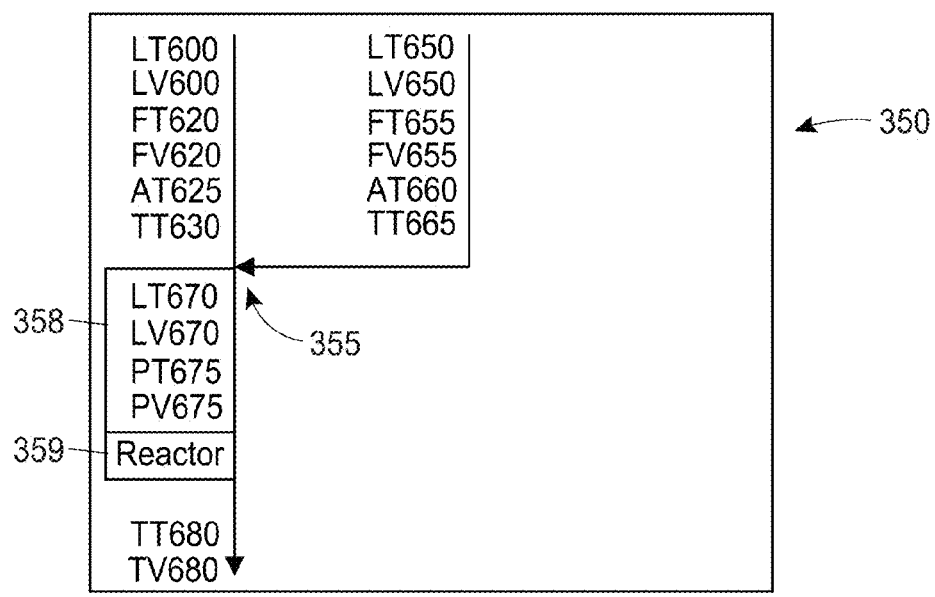
Figure 7C:
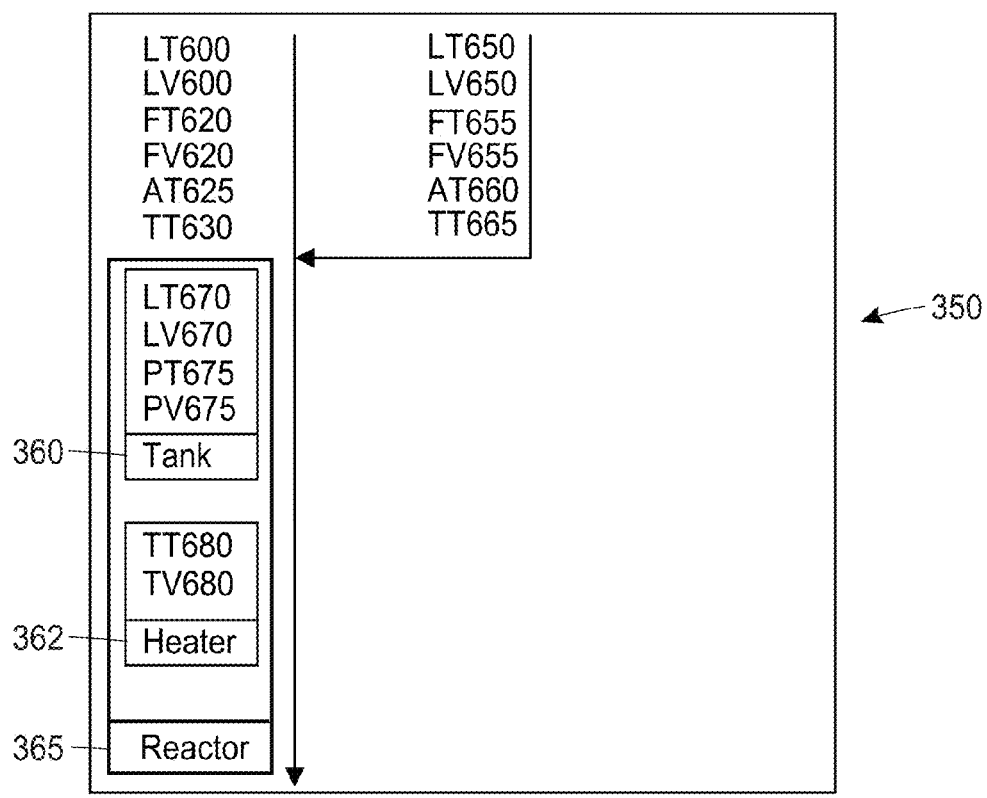

Further, the representations of the process elements during the commissioning process need not be shown on a display view having a representation of the physical process plant (e.g. the pictorial images 320, 325 of the physical plant shown respectively in FIGS. 6A and 6B, or the non-pictorial representation 350 of the physical plant shown in FIGS. 7A-7C) to determine or obtain the relative ordering of the process elements (block 308). In an embodiment (not shown), a display view presenting a representation of the process flow through the process plant (e.g., in a graphical, block diagram, or other representation) may be presented on a user interface, and a user may position representations of various process elements along the process flow, e.g. as said process elements are commissioned. Using the display view of the process flow instead of the physical process plant may be particularly useful when the physical arrangement of the process plant is complex. However, the relative ordering of process elements may be determined and/or obtained (block 308) by using display views or representations of any physical and/or logical representations of the process plant or desired portions thereof.

Returning now to FIG. 5 and the method 300, after the identification information of the process element and the indication of the relative order of the process element within the process flow have been obtained or determined (blocks 302, 308), at a block 310 the method 300 includes determining whether or not additional process elements are to be processed. If so, the method 300 returns to the block 302. Otherwise, the method 300 determines an order of a plurality of process elements (block 312), where the plurality of process elements includes the target process elements that have been processed at the blocks 302-308. The order of the plurality of process elements indicates the order in which the plurality of process elements are activated (or are to be activated) during the flow of at least a portion of the process. As such, the determined order may indicate, describe or define a portion of a process element alignment map that corresponds to the at least the portion of the process. Further, the order of the plurality of process elements may be determined (block 312) using any one or more of the above discussed techniques, such as receiving user input applied to a pictorial and/or to a non-pictorial display view, determining an order in which device specific information was scanned, image processing, determining physical locations, etc., as well as by using other additional or alternative other suitable techniques. In some cases, the order of the plurality of process elements is determined (block 312) automatically without using any real-time user input that explicitly indicates the order. For example, the order of the plurality of process elements may be automatically determined by the computing device 212 based on the determined locations of each of the plurality of process elements. In some cases, the order of the plurality of process elements is determined (block 312) at least in part by using manual input, e.g., when a user indicates a change to an automatically determined draft of the order, or when a user selects members of a set of process elements in a particular order. The order of the plurality of process elements is determined (block 312), in an embodiment, by the alignment generator 260 of the computing device 212. Further, the determined order of the process elements may be stored, for example, in the memory 220 of the computing device 212, and a representation of the order may be presented on the display 228 of the computing device 212, e.g., to allow for verification, modification, and/or approval by the user.

At a block 315, the method 300 includes providing the determined order of the plurality of process elements to a node of a big data network servicing the process plant. The big data network may operate on the order of the plurality of process elements (and optionally, on other indications of other process elements' relative orderings) to generate a larger portion of (or the entirety of) the process element alignment map. For example, the big data network may utilize one or more analytics or learning routines to determine the process element alignment map using the provided relative order of the process element and some or all of the techniques disclosed in aforementioned U.S. patent application Ser. No. 14/212,411. In some situations, the big data network may apply one or more analytics routines to the provided relative ordering of the plurality of process elements to discover or learn new information about the process. For example, the big data network may determine, based on the provided relative ordering of the plurality of process elements, the strengths of correlation of upstream process elements with which downstream process behaviors, root causes of abnormal variations in behavior of particular process elements, etc. Examples of these and other discovery and learning based on process element alignment are found in aforementioned U.S. patent application Ser. No. 14/212,411.

It is noted that in some embodiments of the method 300, the blocks 308 and 312 are integrally performed. In an example, the order of the plurality of process elements within the process flow is determined (block 312) incrementally, e.g., as the relative order of each individual process element included therein is determined (block 308). Accordingly, in this example, the block 312 occurs prior to the block 310.

It is further noted that in some embodiments of the method 300, the block 312 is omitted. For example, rather than the computing device 212 determining a portion of the process element alignment map or determining the order of a plurality of process elements (block 312), the computing device 212 may simply provide an indication of a respective relative ordering of each process element to the process control big data network as each process element is commissioned (block 305) and/or as the respective relative ordering of each process element is determined (block 308). Subsequently, the process control big data network may operate on a plurality of received, individual relative orderings of a plurality of process elements to determine at least a portion of the process element alignment map.

In some embodiments, the apparatus or device 212 on which at least a portion of the method 300 is performed is itself a big data node of the process control big data network. For example, at least a portion of the method 300 is performed by a wireless commissioning device that connects, e.g., in an ad-hoc manner, to the process control big data network as a big data node. In these configurations, the big data node on which at least a portion of the method 300 is performed may perform one or more analytics routines 252 on the determined order of the plurality of process elements and/or on any stored data to generate learned knowledge.

Figure 8:
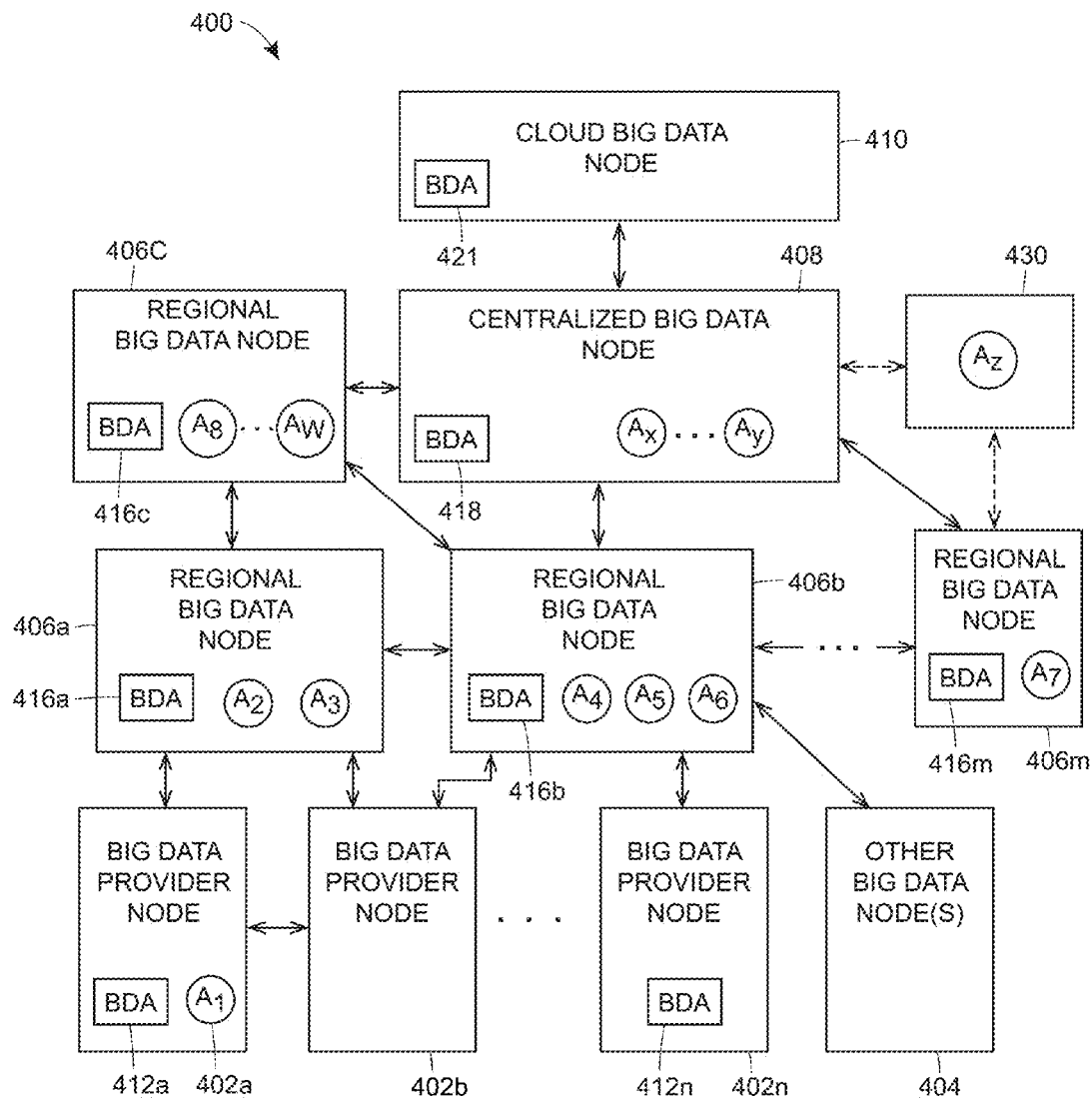
FIG. 8 is a block diagram of an example big data network for a process plant or process control system that supports big data.

A simplified block diagram of an example process control big data network 400 to support a process plant or process control system that controls one or more processes is illustrated in FIG. 8. In particular, the process control the big data network 400 may operate in conjunction with embodiments of the device 212 of FIG. 4 and/or of the method 300 of FIG. 5. The process control big data network 400 includes one or more process control big data nodes 402-410, each of which collects, observes, generates, stores, analyzes, accesses, transmits, receives, and/or operates on process control big data. The terms "process control big data," "process big data," and "big data," as used interchangeably herein, generally refer to all (or almost all) data that is generated, received, and/or observed by devices included in and associated with the process control system or plant. In an embodiment, all data that is generated by, created by, received at, or otherwise observed by all devices included in and associated with the process plant is collected and stored as big data within the process control big data network 400.

The example process control big data network 400 includes one or more different types of process control big data nodes or devices 402-410, each of which collects, observes, generates, stores, analyzes, accesses, transmits, receives, and/or operates on process control big data generated from or based on the control of the one or more processes by the process plant or process control system. Each process control big data node or device 402-410 is connected to a process control system big data network backbone (not shown), and may use the backbone to communicate with one or more other process control big data nodes. Accordingly, the process control big data network 400 comprises the process control system big data network backbone as well as the process control big data nodes 402-410 that are communicatively connected thereto. In an example, the process control big data network 400 includes a plurality of networked computing devices or switches that are configured to route packets to/from various other devices, switches or nodes of the network 400 via the backbone.

The process control big data network backbone comprises any number of wired communication links and any number of wireless communication links that support one or more suitable routing protocols, e.g., protocols included in the Internet Protocol (IP) suite (e.g., UDP (User Datagram Protocol), TCP (Transmission Control Protocol), Ethernet, etc.), or other suitable routing protocols. In an embodiment, the backbone supports a streaming protocol such as the Stream Control Transmission Protocol (SCTP) and/or another suitable streaming protocol to stream (e.g., transport) data between process control big data nodes. For example, U.S. application Ser. No. 14/506,863 entitled "STREAMING DATA FOR ANALYTICS IN PROCESS CONTROL SYSTEMS" and filed Oct. 6, 2014, the entire contents of which are hereby incorporated herein, describes examples of streaming protocols and techniques for process control big data, any one or more of which may be utilized by the process control big data network backbone in the network 400. Typically, each node included in the process data big data network 400 may support at least an application layer (and, for some nodes, additional layers) of the routing protocol(s) supported by the backbone. In an embodiment, each process control big data node 402-410 is uniquely identified within the process control system big data network 400, e.g., by a unique network address.

In an embodiment, at least a portion of the process control system big data network 400 is an ad-hoc network. As such, at least some of the nodes 402-410 (and/or one or more other nodes, such as a user interface device 430) may connect to the network backbone (or to another node of the network 400) in an ad-hoc manner. Indeed, in an embodiment, the user interface device 430 includes the computing device 212 of FIG. 3 and connects to the network 400 to deliver identification information and indications of relative orderings of process elements, in some cases in conjunction with commissioning the process elements. Further, in some scenarios, the user interface device 430 additionally or alternatively provides an order of a plurality of process elements within the process flow and/or at least a portion of a process element alignment map to the network 400, where the provided information has been determined by the user interface device 430, e.g., based on data that has been obtained during the commissioning of process elements.

FIG. 8 is a simplified diagram that depicts communicative connections between various big data nodes 402-410 in the process control big data network 400. As such, the process control network backbone is not explicitly illustrated therein. However, an example of such a backbone which may be utilized with any or all of the techniques described herein is described in aforementioned U.S. patent application Ser. No. 13/784,041. Of course, any or all of the techniques described herein are not limited to being utilized with the backbone described in U.S. patent application Ser. No. 13/784,041, but may be utilized with any suitable communication network backbone.

Turning now to the different types of process control big data nodes or devices 402-410, generally, a process control big data node of the network 400 may be a "big data provider" and/or may include a "big data appliance," as is discussed below.

The terms "big data provider," "big data provider node," or "provider node," as used interchangeably herein, generally refer to a process control big data node that collects, generates, observes, and/or forwards process control related big data using the process control big data network 400. The process control big data that is generated, collected, observed, and/or forwarded by provider nodes may include data that has been directly utilized in or generated from controlling a process within the plant, e.g., first-order real-time and configuration data that is generated or used by process control devices such as controllers, input/output (I/O) devices, and field devices. Additionally or alternatively, process control big data provider nodes may generate, collect, observe, and/or forward data related to delivering and routing such first-order process control data and other data within the process plant, e.g., data related to network control of the big data network 400 and/or of other communication networks in the plant, data indicative of bandwidth, network access attempts, diagnostic data, etc. Further, some process control big data provider nodes may generate, collect, observe, and/or forward data indicative of results, learning, and/or information that has been learned within the process control big data network 400 by analyzing process control big data that it has collected. Typically, such analytics results, learning, and/or learned information are generated from automatic, autonomous analytics performed by one or more process control big data nodes.

In most cases, a big data provider node includes multi-core hardware (e.g., multi-core processors) for transmitting and receiving big data in real-time (e.g., streamed) and, in some embodiments, for caching the real-time big data in preparation for streaming or other delivery over the process control big data network 400. A big data provider node may, in some embodiments, also include high-density memory for the caching of the real-time big data. Examples of real-time data that may be transmitted, received, streamed, cached, collected, and/or otherwise observed by big data provider nodes may include process control data such as measurement data, configuration data, batch data, event data, and/or continuous data. For instance, real-time data corresponding to configurations, batch recipes, setpoints, outputs, rates, control actions, diagnostics, alarms, events and/or changes thereto may be collected. Other examples of real-time data may include process models, statistics, status data, and network and plant management data. In some embodiments, a big data provider node does not cache at least some of the real-time big data that it observes, but instead streams the un-cached data to one or more other big data nodes as the data is observed, received, or generated at the node. Examples of big data provider nodes which may be utilized with any or all of the techniques described herein may be found in aforementioned U.S. patent application Ser. Nos. 13/784,041, 14/174,413, and 14/212,493. Of course, any or all of the techniques described herein may be alternatively or additionally utilized with big data provider nodes other than those described in U.S. application Ser. Nos. 13/784,041, 14/174,413, and 14/212,493.

On the other hand, the terms "big data appliance," "big data appliance node," or "appliance node," as used interchangeably herein, generally refer to a process control big data node that receives, stores, retrieves, and analyzes process control big data. As such, a process control big data appliance (or "BDA") generally operates on big data that has been generated or provided by one or more process control big data provider nodes. In some cases, a big data appliance is included in a big data provider node, or is integrally co-resident with a big data provider within a same node or device. In such cases, the big data appliance is referred to as an "embedded big data appliance," as the appliance is embedded in the provider node or device and operates on the big data that has been received, collected, or generated by the co-resident big data provider. In an example, an embedded big data appliance analyzes big data that has been locally generated and/or provided by the big data provider node on which the embedded big data appliance resides to discover or learn knowledge. This learned knowledge may be stored at the embedded big data appliance, operated on locally by the embedded big data appliance, and/or provided as big data to other big data nodes. Any or all of the techniques described herein may be utilized in conjunction with embedded big data appliances such as described in aforementioned U.S. patent application Ser. No. 14/212,493 and/or in U.S. patent application Ser. No. 14/507,188, for example, although other suitable embedded big data appliances may additionally or alternatively utilized. Further, it is noted that in embodiments in which a big data provider node includes an embedded big data appliance, the cache of the big data provider node may be reduced in size or omitted, as the embedded big data appliance provides local data storage capabilities.

In some cases, a big data appliance may be a stand-alone big data node of the process control big data network 400. That is, in these cases, a big data appliance is not embedded in or co-resident with a big data provider node. Thus, a process control big data node that includes a big data appliance may not necessarily itself be a provider of big data.

Figure 9:
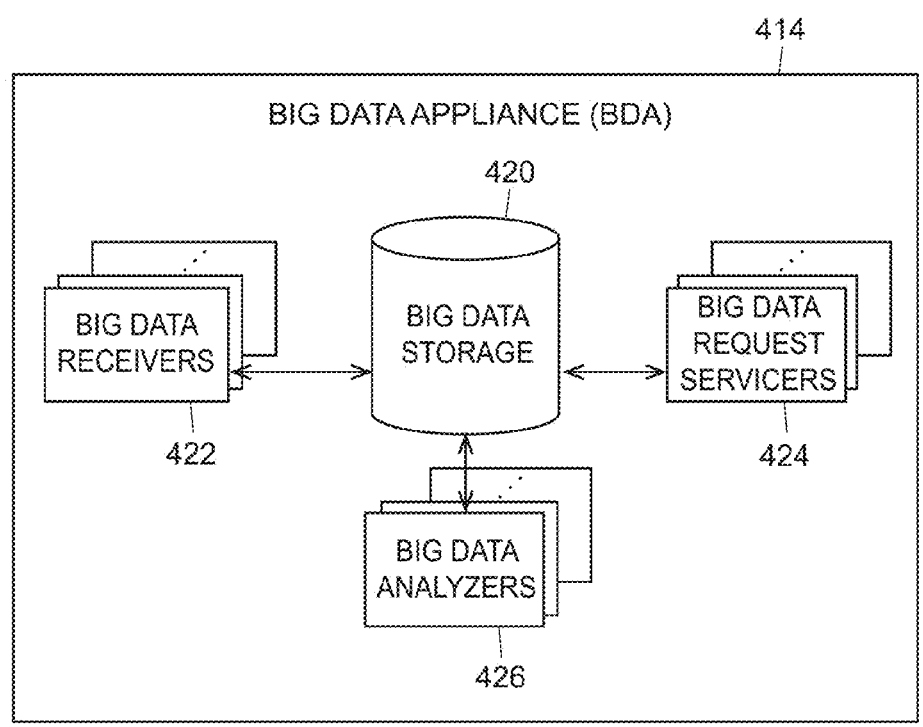
FIG. 9 is a block diagram of an example big data appliance that may be included in the process control big data network of FIG. 8.

FIG. 9 depicts a simplified block diagram of an example big data appliance 414, instances of which may be included in the process control big data network 400 of FIG. 8. Referring to FIG. 9, the example big data appliance 414 includes a big data storage area 420 for historizing or storing received big data, one or more big data appliance receivers 422, and one or more big data appliance request servicers 424. Each of the big data appliance receivers 422 is configured to receive big data packets (which may be streamed from another node and/or may be generated by a big data provider node on which the appliance 414 resides), process the data packets to retrieve the substantive data and timestamp carried therein, and store the substantive data and timestamp in the big data storage area 420 of the appliance 414, e.g., as time-series data and optionally also as metadata. For example, a data point may be tagged and stored as metadata. The big data storage area 420 may comprise multiple local and/or remote physical data drives or storage entities, such as RAID (Redundant Array of Independent Disks) storage, solid-state storage, cloud storage, high-density data storage, and/or any other suitable data storage technology that is suitable for data bank or data center storage, and that has the appearance of a single or unitary logical data storage area or entity to other nodes. Further, each of the big data appliance request servicers 424 is configured to access time-series data and/or metadata stored in the big data appliance storage area 420, e.g., per the request of a requesting entity or application.

In some instances, a big data appliance 414 includes one or more big data analyzers 426 to perform respective data analytics and/or learning on at least parts of the stored big data, typically in an automatic and/or autonomous manner without using any user input to initiate and/or perform the learning analysis. In an embodiment, the big data analyzers 426 individually and/or collectively perform large scale data analysis on the stored data (e.g., data mining, data discovery, etc.) to discover, detect, or learn new information or knowledge. For example, data mining generally involves the process of examining large quantities of data to extract new or previously unknown interesting data or patterns such as unusual records or multiple groups of data records. The big data analyzers 426 may additionally or alternatively perform large scale data analysis on the stored data (e.g., machine learning analysis, data modeling, pattern recognition, predictive analysis, correlation analysis, etc.) to predict, calculate, or identify implicit relationships or inferences within the stored data. In an embodiment, multiple big data analyzers 426 (and/or multiple instances of at least one big data analyzer 426) operate in parallel and/or cooperatively to analyze the data stored in the big data storage area 420 of the appliance 414. An example of cooperative data analytics which may be utilized with any or all of the techniques described herein is found in aforementioned U.S. Application No. 62/060,408 entitled "DATA PIPELINE FOR PROCESS CONTROL SYSTEM ANALYTICS," and/or in aforementioned U.S. patent application Ser. No. 14/507,188 entitled "REGIONAL BIG DATA IN PROCESS CONTROL SYSTEMS," although any suitable cooperative data analytics technique or techniques may be utilized with any or all aspects of the present disclosure.

Typically, each of the big data appliance receivers 422, the big data appliance request servicers 424, and the big data analyzers 426 comprise respective computer-executable instructions stored on one or more non-transitory, tangible memories or data storage devices, and are executable by one or more processor to perform one or more their respective big data functions. In some embodiments, the big data analyzers 426 are not included in the big data appliance 414, but instead are in communicative connection with the big data appliance 414. For example, the big data appliance 414, including the storage area 420, receivers 422 and servicers 424 may be implemented by a first set of computer-executable instructions, and the big data analyzers 426 may be implemented by a second set of computer-executable instructions (which may or may not be stored on the same non-transitory, tangible memories or data storage devices as the first set of computer-executable instructions). Descriptions of various types of example big data appliances and their components which may be utilized with any or all of the techniques described herein may be found in aforementioned U.S. patent application Ser. Nos. 13/784,041, 14/174, 413, and 14/212,493, although it is understood that any or all of the techniques described herein may be utilized with other suitable big data appliances.

Returning to FIG. 8, the process control big data network 400 may include process control big data provider nodes 402-410 that operate at various levels, tiers, or orders with respect to first-order or primary process related data that is directly generated, routed, and/or used by process control devices such as controllers, I/O devices, field devices, etc. At the lowest order, tier, or level, "local" big data provider nodes or devices 402a-402n that operate nearest to the process to collect, generate, observe, and/or forward primary process big data related to the input, operation, and output of process devices and equipment in the process plant. As such, "local big data provider nodes or devices" 402a-402n typically are nodes and/or devices that generate, route, and/or receive primary process control data to enable the one or more processes to be controlled in real-time in the process plant. Examples of local big data provider nodes 402a-402n include devices whose primary function is directed to generating and/or operating on process control data to control a process, e.g., wired and wireless field devices, controllers, and I/O devices. These process control devices may be communicatively connected to each other and/or to one or more process control communications networks in a distributed manner. For instance, one or more field devices are communicatively connected to one or more I/O devices, which in turn are communicatively connected to one or more controllers, which in turn are communicatively coupled to one or more process control communication networks (e.g., HART®, WirelessHART®, process control big data, FOUNDATION® Fieldbus, etc.).

Other examples of local big data provider nodes 402a-402n include devices whose primary function is to provide access to or routing of primary process data through one or more communications networks of the process control system (which may include the process control big data network 400 and/or other communication networks). Examples of such types of local big data provider nodes 402a-402n include access points, routers, interfaces to wired control busses, gateways to wireless communications networks, gateways to external networks or systems such as lab information systems that provide lab analysis of samples, and other such routing and networking devices. Still other examples of local big data provider nodes 402a-402n include devices, such as historian devices, that are configured to temporarily store big data throughout the process control system, e.g., as an overflow cache, way-station, or routing queue.

In some cases, a local big data provider node includes a respective local big data appliance, as illustrated in FIG. 8 by the nodes 402a-402n that respectively include the embedded big data appliances 412a-412n. Each local, embedded big data appliance 412a-412n receives and stores respective local big data provided by its respective provider 402a-402n. Further, in some local big data provider nodes, such as in the node 402a, one or more analytics functions, routines, operations, or processes (represented by the encircled $A_1$) may be performed on at least some of the local big data stored in the appliance 412a. In an embodiment, the analytics $A_1$ are performed by one or more of the big data analyzers 426 of FIG. 9. The learned information, learnings, and/or the results of the one or more analytics $A_1$ may also be stored in the local big data appliance 412a, and at least some of the learned information or results may be provided to another big data node 406a, 402b.

Some local provider nodes, e.g., as illustrated by the node 402n, include a respective local, embedded big data appliance 412n for local big data collection and historization, however, the resident appliance 412n performs minimal or no analytics. As such, the node 402n merely streams (or otherwise transmits, e.g., upon request or at suitable times) locally stored big data to another node 406b, e.g. for analytical processing or for further forwarding. Some local big data nodes, e.g., the node 402b, do not include any big data appliance at all. Such nodes 402b may stream, in real-time or with the aid of a cache, locally observed big data to one or more other big data nodes 402a, 406b.

Various types of real-time data, such as process-related data, plant-related data, and other types of data, may be cached, collected, stored, transmitted, and/or streamed as big data by the big data provider nodes or devices 402a-402n. Examples of process-related data include continuous, batch, measurement, and event data that are generated while a process is being controlled in the process plant (and, in some cases, are indicative of an effect of a real-time execution of the process). Further, process-related data may include process definitions, arrangement or set-up data such as configuration data and/or batch recipe data, data corresponding to the configuration, execution and results of process diagnostics, etc.

Plant-related data, such as data related to the process plant but that may not be generated by applications that directly configure, control, or diagnose a process in the process plant, may also cached, collected, stored, transmitted, and/or streamed by the big data provider nodes 402a-402n as big data. Examples of plant-related data include vibration data, steam trap data, data indicative of a value of a parameter corresponding to plant safety (e.g., corrosion data, gas detection data, etc.), data indicative of an event corresponding to plant safety, data corresponding to the health of machines, plant equipment and/or devices, data corresponding to the configuration, execution and results of equipment, machine, and/or device diagnostics, and data that is useful for diagnostics and prognostics.

Further, other types of data including data highway traffic and network management data related to the process control big data network backbone and of various communications networks of the process plant, user-related data such as data related to user traffic, login attempts, queries and instructions, text data (e.g., logs, operating procedures, manuals, etc.), spatial data (e.g., location-based data), and multi-media data (e.g., closed circuit TV, video clips, etc.) may be cached, collected, stored, transmitted, and/or streamed by the big data provider nodes 402a-402n as big data.

In some embodiments, dynamic measurement and control data may be automatically cached, collected, stored, transmitted, and/or streamed by the big data provider nodes 402a-402n as big data. Examples of dynamic measurement and control data include data specifying changes in a process operation, data specifying changes in operating parameters such as setpoints, records of process and hardware alarms and events such as downloads or communication failures, etc. In addition, static data such as controller configurations, batch recipes, alarms and events may be automatically collected by default when a change is detected or when a controller or other entity is initially added to the big data network 400.

Moreover, in some scenarios, at least some static metadata that describes or identifies dynamic control and measurement data is captured in the big data provider nodes 402a-402n when a change in the metadata is detected. For example, if a change is made in the controller configuration that impacts the measurement and control data in modules or units that must be sent by the controller, then an update of the associated metadata is automatically captured by the big data provider nodes 402a-402n. Additionally or alternatively, parameters associated with the special modules used for buffering data from external systems or sources (e.g., weather forecasts, public events, company decisions, etc.), surveillance data, and/or other types of monitoring data may be automatically captured by the big data provider nodes 402a-402n.

In some situations, added parameters created by end users are automatically captured in the big data provider nodes 402a-402n. For example, an end user may create a special calculation in a module or may add a parameter to a unit that needs to be collected, or the end user may want to collect a standard controller diagnostic parameter that is not communicated by default. Parameters that the end user optionally configures may be communicated in the same manner as the default parameters.

Referring again to the network 400 of FIG. 8, at one or more levels or tiers above the local big data nodes 402a-402n, the process control big data network 400 may include one or more regional big data nodes 406a-406m. To implement regional big data, the process plant or process control system may be viewed as having a plurality of different areas or regions which may be delineated according to any desired manner such as geographical, physical, functional, logical, etc. In an illustrative but non-limiting example, a process plant may have a first region that receives raw materials and produces a first intermediate product, a second region that receives other raw materials and produces a second intermediate product, and a third region that receives the first and second intermediate products to produce an output product.

Each of these three different example regions may be serviced by a respective "regional" big data node 406a, 406b, 406m to operate on big data produced by its respective region. Accordingly, a "regional big data node" provides big data support and services for data that is generated and/or provided by a respective grouping or region of local big data provider nodes 402 and, in some cases, by other big data provider nodes 404. Other big data provider nodes 404 may include, for example, big data nodes that are external to the region of the plant (e.g., a portable diagnostics device or an off-line simulator), user interface devices 430, or data sources that are external to the process plant altogether (e.g., a computing device of a materials supplier, a feed providing a weather forecast, etc.).

As shown in FIG. 8, a respective grouping or region serviced by a regional big data node 406a-406m may comprise one or more big data provider nodes 402a-402n and/or other big data nodes 404 that are related according to some geographical, physical, functional, logical, or other desired manner. For example, the regional big data node 406a services a region including the local big data provider nodes 402a and 402b, and the regional big data node 406b services a region including the local big data nodes 402b and 402n, as well as another big data node 404. The particular nodes 402, 404 included in a particular region may stream or deliver data to their respective regional big data node 406 for purposes of regional big data storage, access, and/or analysis. Further, any of the big data provider nodes 402a-402n and/or the other big data nodes 404 may communicate with a particular regional big data node 406a-406m to request regionally available services and/or to access regional big data and metadata stored therein, whether such requesting nodes are included in the particular region of the particular regional big data node 406a-406m or not.

Accordingly, each regional big data node 406a-406m includes a respective regional big data appliance 416a-416m via which big data is received, stored as regional big data, and accessed or requested. Further, each regional big data node 406a-406m typically includes one or more analytics functions, routines, operations, or processes (e.g., $A_2$-$A_w$) that may individually and/or cooperatively operate on at least some of the regional big data. For example, the regional big data appliance 416b may receive local big data from local provider nodes 402b, 402n that are configured to cooperatively control the flow of a liquid through a portion or region of the process plant, and the node 406b may perform an analytics process $A_4$ on at least some of the received data to determine an average transport delay of the liquid within the portion or region of the process plant. The results of the analytics $A_4$ may then be stored or historized as additional regional big data within the regional big data appliance 416b. In an embodiment, each of the analytics $A_2$-$A_w$ are performed by one or more big data analyzers 426 of FIG. 9 that are resident on their respective big data node.

In some situations, the regional big data nodes or devices 406a-406m communicate received or generated big data, learned knowledge or information, and/or analytics results with another regional big data node 406a-406m, e.g., as peers. To illustrate by continuing with the above example, the regional big data node 416ba receives learned information that has been generated by the analytics analysis $A_4$ performed by the regional big data node 406b. Subsequently, the regional big data node 406a may then perform one or more respective regional analytics $A_2$, $A_3$ on at least part of the peer-provided learned information from the node 406b in conjunction with the local big data received from the local big data nodes 402a, 402b within its own region. The analytics $A_2$, $A_3$ may, in turn, generate additional regional big data for historization at the regional big data appliance 516ba and/or for provision to other big data nodes 406b, 406c, 408. As such, as a regional big data node 406a-406m may originate regional big data in some scenarios (e.g., based on the results or learning of any resident analytics that were performed thereby), a regional big data node 406a-406m may also operate as a regional big data provider node.

Grouping of the big data provider nodes 402a-402n under respective regional big data nodes may be carried out according to any desired manner such as geographical, physical, functional, logical, etc. For example, in an illustrative but non-limiting scenario, a process in the process plant may produce a particular product based on two intermediate products. As such, the local big data provider node 402a may represent a first control loop that produces the first intermediate product, and the local big data provider node 402b may represent a second control loop that produces the second intermediate product. Thus, all process control data that is generated, collected, received or otherwise observed by the two control loops 402a, 402b may be transmitted to the regional big data node 406a for historization, storage and analysis.

In a similar manner, the regional big data node 406b may receive and analyze data from its respective group of big data provider nodes. For example, the regional big data node 406b may be responsible for analyzing the big data corresponding to the production of another product that is based on intermediate products from each of the big data provider nodes 402b, 402n in conjunction with big data provided by other sources 404.

At the regional big data node 406a, the received big data may be analyzed (e.g., by using one or more analytics functions or processes $A_2$, $A_3$) to create or generate learned knowledge that describe meaningful relationships, patterns, correlations, trends, etc., across time and/or across at least some of the various data sets. For example, a certain combination of events in the two control loops 402a, 402b may lead to poor product quality when the particular product is eventually produced. To determine the root causes of the poor product quality, the regional big data node 406a analyzes data generated by the combination of events at or shortly after their occurrence (e.g., when the data corresponding to the events' occurrences is received at the regional big data node 406a). The regional big data node 406a may generate learned knowledge that predicts the poor product quality based on the occurrence of these events, and/or may automatically adjust or change one or more parameters in real-time to mitigate the effects of the combination of events if and when they occur in the future. For instance, the regional big data node 406a may determine a revised setpoint or revised parameter values to better regulate and manage the two control loops 402a, 402b.

Generally, each regional big data node 406a-406m (or its respective big data appliance 416a-416m) analyzes data from its respective group or region of big data provider nodes to determine meaningful patterns, correlations, trends, etc. The learned patterns, correlations, trends, etc. is then stored in the respective regional big data appliances 416a-416m as learned knowledge. As used herein, the term "learned knowledge" or "learnings" generally refers to data, services, functions, routines, and/or applications that are generated as a result of one or more analyses being performed on big data. Further, each regional big data node 406a-406m (or its respective big data appliance 416a-416m) may determine or define a new service, function, routine, or application (and/or modify an existing service, function, routine, or application) based on the initially learned knowledge, which, in turn, is stored as further learned knowledge.

Regional big data nodes 406a-406m may be utilized for layered or leveled learning. For example, one or more regional big data nodes may transmit their learned knowledge and/or stored data to an upstream big data node that oversees multiple regions. As shown in FIG. 8, a regional big data node 406c receives learned knowledge and/or data from the regional big data nodes 406a and 406b, and the node 406c historizes the received big data in its respective embedded appliance 416c. The regional big data node 406c may perform further analysis or learning on at least some of the received learned knowledge and/or data (e.g., by using one or more of the analytics functions $A_8$-$A_w$) to generate additional learned knowledge (e.g., data patterns, trends, correlations, etc., services, functions, routines, and/or applications), which may be, in turn, stored as additional regional big data within the embedded appliance 416c and/or provided to other big data nodes 406a, 406b, 408.

As both regional big data appliances and localized big data appliances service different respective big data nodes and/or different respective groups or regions of the process plant, but do not service the entire process plant or more than one region thereof, both regional big data appliances and localized big data appliances are generally and categorically referred to herein as "distributed big data appliances." Generally, distributed big data appliances communicate big data with multiple other big data appliances. For example, a local big data appliance included in a particular big data provider node may communicate learned knowledge and/or big data to other localized big data appliances included in other big data provider nodes, to one or more regional big data appliances, and/or to a centralized big data appliance (which is described in more detail below). Similarly, a regional big data appliance may receive big data from one or more localized big data appliances and/or big data provider nodes. The regional big data appliance may communicate learned knowledge and/or big data to other regional big data appliances, and/or to a centralized big data appliance.

As mentioned above, in some configurations of the process control big data network 400, at least some of the regional big data nodes or devices 406a-406m, local big data nodes or devices 402a-402n, and/or other big data nodes or devices 404 communicate respective big data, analytics results, and/or learned information to a centralized big data node 408. A "centralized big data node," as referred to herein, typically services multiple regions of the process plant, and in some situations, services a majority or an entirety of the process plant. As such, the centralized big data node 408 includes one or more centralized, embedded big data appliances 418 to receive, store, and provide access to process plant big data. For example, the centralized big data appliance 418 may provide comprehensive, long-term historization of most or all of the big data generated by the process plant, and/or the centralized big data appliance 418 may publish big data for process plant-wide availability to other big data nodes, or even to computing devices within or external to the process plant that are not process control big data nodes.

In some configurations, a single centralized big data node 408 or appliance 418 may not service an entire process control system or plant, but may service more than one region of the process control system or plant. For example, different centralized big data nodes 408 or appliances 418 may be used within a single plant or system to partition different types or areas of big data for security and access purposes. In some configurations, a single centralized big data node 408 or appliance 418 services the entire process plant.

In the process plant, one or more of the regional big data nodes 406a-406m may cause some or all of its generated or received learned knowledge and/or data to be streamed or otherwise delivered to the centralized big data node 408. For example, one or more of the regional big data nodes 406a-406m transmits at least some of its respectively stored learned knowledge and/or data to the centralized big data node 408. In some embodiments, one or more of the regional big data nodes 406a-406m pushes at least some of its respectively stored learned knowledge and/or data to the centralized big data node 408 at periodic intervals. In some embodiments, one or more of the regional big data nodes 406a-406m provides at least a portion of its respectively stored learned knowledge and/or data in response to a request from the centralized big data node 408.

The centralized big data node 408 and/or its embedded appliance 418 may be configured to further analyze any or all of the received learned knowledge and/or data received from the regional big data nodes 406a-406m, e.g., by utilizing one or more analytics functions $A_x$-$A_y$. In an embodiment, each of the analytics $A_x$-$A_y$ are performed by one or more big data analyzers 426 of FIG. 9 that are resident on the respective big data node. The one or more analytics functions $A_x$-$A_y$ may operate on the received learned knowledge and/or data to generate additional knowledge and determine relationships between various entities and providers internal and external to the process plant. The additional knowledge and determined relationships may be stored and otherwise utilized as additional centralized big data at the embedded appliance 418, for example. In some cases, the centralized big data node 408 or appliance 418 utilizes the generated knowledge and relationships to control one or more processes of the plant accordingly.

Indeed, any node 402-406 of the big data network 400 may stream or otherwise provide big data to a centralized big data appliance 418, e.g., for historization or long-term storage. For example, a local big data provider node 402 may stream its big data directly to the centralized big data node 408. Similarly, any node 402-406 of the big data network may request services provided by the embedded centralized appliance 418, and/or may request access to data and metadata stored therein. Further, in embodiments in which multiple centralized big data nodes 408 or appliances 418 service a single process plant, the multiple centralized big data nodes 408 or appliances 418 may communicate in a peer-to-peer manner, similar to that described for the regional big data nodes 406a-406m.

Also similar to the regional big data node 406a-406m, a centralized big data node 408 may itself be a producer or provider of big data in some situations, such as when analytics performed by the centralized big data node 408 (e.g., one or more the analytics functions $A_x$-$A_y$) result in additional discovered or learned information that is stored at the centralized big data appliance 418 and made accessible to other big data nodes 402-406. However, typically, the majority of the volume of big data handled and serviced by a centralized big data appliance 418 is received from other big data nodes 402-406. A description of an example centralized big data node 408 and an example centralized big data appliance 418 which may be utilized with any or all of the techniques described herein may be found in aforementioned U.S. patent application Ser. No. 13/784,041. However, it is understood that any or all of the techniques described herein may be alternatively or additionally utilized with centralized big data appliances other than those described in U.S. patent application Ser. No. 13/784,041.

In some configurations, a centralized big data node 408 communicates data and learned information to a remote big data node (e.g., a big data node that is remote with respect to the process plant) for big data historization, storage, access, and/or analysis. Such a big data node, referred to herein as a "cloud big data node 410," may provide services to multiple different process plants or process control systems 10. For example, a company that operates multiple different oil refineries may provide a cloud big data node 410 and a cloud big data appliance 421 to service big data related to all of its oil refineries. For instance, via the cloud big data node 410 and the resident cloud big data appliance 421, a centralized big data node of a particular refinery may obtain published big data generated by the process control big data network 400 of the process plant, and may utilize the obtained, published big data for operations at the particular refinery. In some embodiments, any of the big data nodes 402-406 may directly stream or provide data to the cloud big data node 410. Similarly, any of the big data nodes 402-406 may request services provided by the embedded appliance 421 of the cloud big data node 410, and/or access data and metadata stored therein. Although not shown in FIG. 8, a cloud big data node 410 may include one or more respective analytics routines, functions, or processes therein, e.g., as may be provided by big data analyzers 426 of FIG. 9.

Further, it is noted that not all types of big data nodes are included in all process plants. For example, a highest level of big data processing at a particular process plant may be at the regional level, and as such the particular process plant may not include any centralized big data nodes 408, and may not be connected to a cloud big data node 410. Generally, though, to facilitate or support process control big data, a process plant includes at least one local big data provider node 402 and at least one big data appliance 412, 416b, 418.

Additionally, in some embodiments, a process plant includes one or more legacy process control devices (not shown) that do not inherently include any big data support. In these embodiments, a gateway node in the plant or an adjunct device directly coupled to a legacy device may convert or translate data messages between a protocol utilized by the legacy device and the protocol utilized by the process control big data network backbone, thereby communicatively connecting the legacy device and the process control big data network 400. Examples of legacy devices being used with a process control big data network are discussed in aforementioned U.S. application Ser. No. 14/506,863, entitled "STREAMING DATA FOR ANALYTICS IN PROCESS CONTROL SYSTEMS."

In FIG. 8, the user interface device 430 is depicted a big data node that is wirelessly connected to the process control big data network 400. In some configurations, one or more of the big data nodes or devices 402-410 may have the capability to be in communicative connection with one or more user interface devices 430, e.g., by communicating over a wired or wireless communication link, or by plugging a user interface device 430 into a port of the big data nodes or devices 402-410.

The user interface device 430 is a device (e.g., a mobile or stationary computing device, a workstation, a handheld device, a surface computing device, a tablet, etc.) that includes one or more integrated user interfaces via which a user or operator may interact with the device and the process control system or process plant to perform activities related to the process plant (e.g., commission, configure, view, monitor, test, diagnose, order, plan, schedule, annotate, and/or other activities). Integrated user interfaces at the device 430 may include a screen, a keyboard, keypad, mouse, buttons, touch screen, touch pad, biometric interface, speakers and microphones, cameras, and/or any other user interface technology. The user interface device 430 may include a direct wired and/or wireless connection to the process control system big data network backbone, or may include an indirect connection to the backbone, e.g., via an access point or a gateway. As previously discussed, in some embodiments, the user interface device 430 includes the device 212 that is used to determine process element alignment of process elements and, in some cases, commission process elements. In these embodiments, the user interface device 430 includes a wired and/or wireless connection via which data stored at or on a target process element may be obtained, e.g., such as in a manner previously discussed. This wired and/or wireless connection may be the same wired and/or wireless connection via which the user interface device 430 is connected to the process control system big data network backbone, or it may be a different connection.

Also as previously discussed, in some embodiments, a user interface device 430 may have one or more built-in analytic capabilities (denoted in FIG. 8 by the encircled $A_z$). In other words, a user interface device 430 may communicate with any number of big data nodes and/or big data appliances to download and/or receive data and perform local analysis $A_z$ on the downloaded/received data to discover or learn knowledge. For example, the local analysis $A_z$ may include one or more analytics capabilities 252 that the user interface device 430 may apply to data that was obtained (e.g., at the block 302 and/or at block 305 of FIG. 5). Indeed, in some configurations, a user interface device 430 may itself be a big data provider node, and may itself provide at least some of the results of its analysis $A_z$ as big data to one or more other local, regional, centralized, or cloud big data nodes 402-410. Examples of the usage of user interface devices in process control big data networks (which may be utilized with any or all of the techniques described herein) may be found, for example, in aforementioned U.S. patent application Ser. No. 14/028,785. Of course, however, other techniques of utilizing user interface devices with process control big data network 400 may be alternatively or additionally employed in conjunction with any or all of the techniques described herein.

Figure 10:
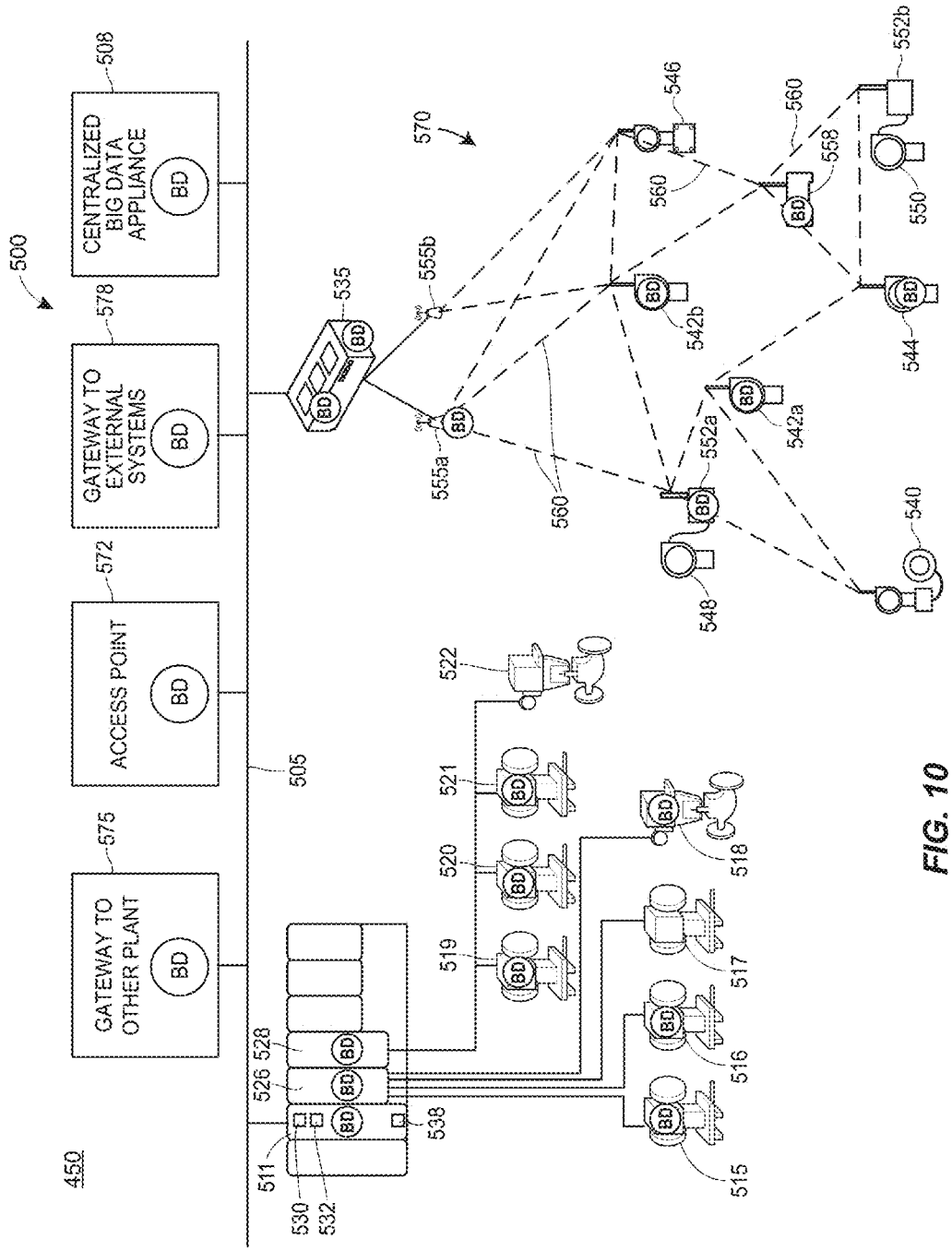
FIG. 10 is a block diagram illustrating an example process plant or process control system that includes example big data devices or nodes that produce, collect or utilize big data in the process control big data network of FIG. 8.

Turning now to FIG. 10, FIG. 10 is a block diagram including various example aspects of an example process plant or process control system 450 in which the techniques, methods, systems and apparatuses disclosed herein may be implemented and included. In an embodiment, at least a portion of the process plant 450 is supported by a process control big data network, such as the process control big data network 400 of FIG. 8. However, while the process plant 450 is described below with respect to features illustrated in FIGS. 8-9 for ease of discussion and not for limitation purposes, it is understood that the process plant 450 may utilize a process control big data network other than that described in FIG. 8, or the process plant 4500 may omit any process control big data network, nodes, and/or devices.

In FIG. 10, process control big data nodes or devices are indicated by a "BD" reference that signifies that the node is a process control big data provider node, a big data appliance, or both. For example, nodes or devices indicated by a "BD" reference in FIG. 10 may be, referring to FIG. 8, a local big data provider node and/or appliance 402a-402n, 412a-412n, a regional big data provider node and/or appliance 406a-406m, 416ba-416m, a centralized big data provider node 408 and/or appliance 418, or another type of big data node 404.

In FIG. 10, the process control big data nodes BD are nodes of a process control big data network 500. In an embodiment, the process control big data network 500 is the process control big data network 400 of FIG. 8, and the nodes BD are the nodes 402-408 of the network 400. In FIG. 10, the nodes BD are communicatively connected over the network 500 via a process control system big data network backbone 505. The backbone 505 includes a plurality of networked computing devices or switches that are configured to route packets to/from various process control big data nodes BD. The plurality of networked computing devices of the backbone 505 may be interconnected by any number of wireless and/or wired links, and the big data network backbone 505 may support one or more suitable routing protocols, such as a process control big data streaming protocol, as previously discussed with respect to the network 400.

As shown in FIG. 10, the process control big data network 500 includes a centralized big data appliance 508 and multiple other big data provider nodes 511, 515, 516, 518, 519, 520, 521, 526, 528, 535, 542a, 542b, 544, 552a, 555a, 558, 572, 575, 578. One of the example big data provider nodes is a big data process controller device 511 that locally collects, analyzes and stores big data of the process control network or plant 450. The controller 511 is communicatively connected to wired field devices 515-522 via input/output (I/O) cards 526 and 528, and is communicatively connected to wireless field devices 540-546 via a wireless gateway 535 and the process control big data network backbone 505. (In another embodiment, though, the controller 511 may be communicatively connected to the wireless gateway 535 using a communications network other than the big data backbone 505, such as by using a process control communications network that includes any number of wired and/or wireless communication links.) In FIG. 10, the controller 511 is a big data provider node BD of the process control system big data network 500, and is directly connected to the process control big data network backbone 505.

The controller 511, which may be, by way of example, the DeltaV™ controller sold by Emerson Process Management, may operate to implement a batch process or a continuous process using at least some of the field devices 515-522 and 540-546. In an embodiment, in addition to being communicatively connected to the process control big data network backbone 505, the controller 511 may also be communicatively connected to at least some of the field devices 515-522 and 540-546 using any desired hardware, software, and/or communications links or networks associated with, for example, standard 4-20 mA devices, I/O cards 526, 528, and/or any smart communication protocol such as the FOUNDATION® Fieldbus protocol, the HART® protocol, the WirelessHART® protocol, etc. In an embodiment, the controller 511 may be communicatively connected with at least some of the field devices 515-522 and 540-546 using the process control big data network backbone 505. In FIG. 10, the controller 511, the field devices 515-522 and the I/O cards 526, 528 are wired devices, and the field devices 540-546 are wireless field devices. Of course, the wired field devices 515-522 and wireless field devices 540-546 could conform to any other desired standard(s) or protocols, such as any wired or wireless protocols, including any standards or protocols developed in the future.

The process controller device 511 includes a processor 530 that implements or oversees one or more process control routines (e.g., that are stored in a memory 532), which may include control loops. The processor 530 is configured to communicate with the field devices 515-522 and 540-546 and with other process control big data nodes BD that are communicatively connected to the backbone 505. It should be noted that any control routines or modules (including quality prediction and fault detection modules or function blocks) described herein may have parts thereof implemented or executed by different controllers or other devices if so desired. Likewise, the control routines or modules described herein which are to be implemented within the process control system 450 may take any form, including software, firmware, hardware, etc. Control routines may be implemented in any desired software format, such as using object oriented programming, ladder logic, sequential function charts, function block diagrams, or using any other software programming language or design paradigm. The control routines may be stored in any desired type of memory, such as random access memory (RAM), or read only memory (ROM). Likewise, the control routines may be hard-coded into, for example, one or more EPROMs, EEPROMs, application specific integrated circuits (ASICs), or any other hardware or firmware elements. Thus, the controller 511 may be configured to implement a control strategy or control routine in any desired manner.

In some embodiments, the controller 511 implements a control strategy using what are commonly referred to as function blocks, wherein each function block is an object or other part (e.g., a subroutine) of an overall control routine and operates in conjunction with other function blocks (via communications called links) to implement process control loops within the process control system 450. Control based function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 450. Of course, hybrid and other types of function blocks exist. Function blocks may be stored in and executed by the controller 511, which is typically the case when these function blocks are used for, or are associated with standard 4-20 mA devices and some types of smart field devices such as HART devices, or may be stored in and implemented by the field devices themselves, which can be the case with Fieldbus devices. The controller 511 may include one or more control routines 538 that may implement one or more control loops. Each control loop is typically referred to as a control module, and may be performed by executing one or more of the function blocks.

The wired devices 511-522 shown in FIG. 10 include big data wired process control devices 515, 516, and 518-521 and the I/O cards 526, 528. FIG. 10 also shows wired legacy devices 517 and 522, which may operate in conjunction with the wired big data devices 515, 518-521, 526, 528 within the process plant. The wired field devices 515-522 may be any types of devices, such as sensors, valves, transmitters, positioners, etc., while the I/O cards 526 and 528 may be any types of I/O devices conforming to any desired communication or controller protocol. In FIG. 10, the field devices 515-518 are standard 4-20 mA devices or HART devices that communicate over analog lines or combined analog and digital lines to the I/O card 526, while the field devices 519-522 are smart devices, such as FOUNDATION® Fieldbus field devices, that communicate over a digital bus to the I/O card 528 using a Fieldbus communications protocol. In some embodiments, though, at least some of the big data wired field devices 515, 516 and 518-521 and/or at least some of the big data I/O cards 526, 528 additionally or alternatively communicate with the controller 511 using the big data network backbone 505.

The wireless field devices 540-546 shown in FIG. 10 include examples of wireless big data nodes or devices BD (e.g., devices 542a, 542b, 544). FIG. 10 also includes an example of a legacy wireless device (e.g., device 546). The wireless field devices 540-546 communicate in a wireless network 570 using a wireless protocol, such as the WirelessHART protocol. Such wireless field devices 540-546 may directly communicate with one or more other big data devices or nodes BD of the process control big data network 500 that are also configured to communicate wirelessly (using a wireless streaming protocol, for example). To communicate with one or more other big data nodes that are not configured to communicate wirelessly, the wireless field devices 540-546 may utilize a wireless gateway 535 connected to the backbone 505 or to another process control communications network. Any number of wireless field devices that support big data may be utilized in the process plant 450.

The wireless gateway 535, as illustrated in FIG. 10, is another example of a big data node BD included in the process control plant or system 450, and provides access to/from the various wireless devices 540-558 of a wireless communications network 570. In particular, the wireless gateway 535 provides communicative coupling between the wireless devices 540-558, the wired devices 511-528, and/or other nodes or devices of the process control big data network 500 (including the controller 511 of FIG. 10). For example, the wireless gateway 535 may provide communicative coupling by using the big data network backbone 505 and/or by using one or more other communications networks of the process plant 450.

The wireless gateway 535 provides communicative coupling, in some cases, by the routing, buffering, and timing services to lower layers of the wired and wireless protocol stacks (e.g., address conversion, routing, packet segmentation, prioritization, etc.) while tunneling a shared layer or layers of the wired and wireless protocol stacks. In other cases, the wireless gateway 535 may translate commands between wired and wireless protocols that do not share any protocol layers. In addition to protocol and command conversion, the wireless gateway 535 may provide synchronized clocking used by time slots and superframes (sets of communication time slots spaced equally in time) of a scheduling scheme associated with the wireless protocol implemented in the wireless network 570. Furthermore, the wireless gateway 535 may provide network management and administrative functions for the wireless network 570, such as resource management, performance adjustments, network fault mitigation, monitoring traffic, security, and the like.

Similar to the wired field devices 515-522, the wireless field devices 540-546 of the wireless network 570 may perform physical control functions within the process plant 450, e.g., opening or closing valves or take measurements of process parameters. The wireless field devices 540-546, however, are configured to communicate using the wireless protocol of the network 570. As such, the wireless field devices 540-546, the wireless gateway 535, and other wireless nodes 552-558 of the wireless network 570 are producers and consumers of wireless communication packets.

In some scenarios, the wireless network 570 may include non-wireless devices, which may or may not be big data devices. For example, a field device 548 of FIG. 10 may be a legacy 4-20 mA device and a field device 550 may be a traditional wired HART device. To communicate within the network 570, the field devices 548 and 550 may be connected to the wireless communications network 570 via a wireless adaptor (WA) 552a or 552b. In FIG. 10, the wireless adaptor 552b is shown as being a legacy wireless adaptor that communicates using the wireless protocol, and the wireless adaptor 552a is shown as supporting big data and thus is communicatively connected to the big data network backbone 505. Additionally, the wireless adaptors 552a, 552b may support other communication protocols such as Foundation® Fieldbus, PROFIBUS, DeviceNet, etc. Furthermore, the wireless network 570 may include one or more network access points 555a, 555b, which may be separate physical devices in wired communication with the wireless gateway 535 or may be provided with the wireless gateway 535 as an integral device. In FIG. 10, the network access point 555a is illustrated as being a big data device BD, while the network access point 555b is a legacy access point. The wireless network 570 may also include one or more routers 558 to forward packets from one wireless device to another wireless device within the wireless communications network 570, each of which may or may not support distributed big data in the process control system 450. The wireless devices 540-546 and 552-558 may communicate with each other and with the wireless gateway 535 over wireless links 560 of the wireless communications network 570, and/or via the big data network backbone 505, if the wireless devices are distributed and/or centralized big data devices.

Accordingly, FIG. 10 includes several examples of big data devices of nodes BD which primarily serve to provide network routing functionality and administration to various networks of the process control system. For example, the wireless gateway 535, the access point 555a, and the router 558 each include functionality to route wireless packets in the wireless communications network 570. The wireless gateway 535 performs traffic management and administrative functions for the wireless network 570, as well as routes traffic to and from wired networks that are in communicative connection with the wireless network 570. The wireless network 570 may utilize a wireless process control protocol that specifically supports process control messages and functions, such as WirelessHART. As shown in FIG. 10, the devices 535, 555a, 552a, 542a, 542b and 558 of the wireless network 570 support big data in the process control plant 450, however, any number of any types of nodes of the wireless network 570 may support distributed big data in the process plant 450.

Other devices that communicate using other wireless protocols may be big data nodes or devices BD of the process control big data network 500. In FIG. 10, one or more wireless access points 572 are big data devices BD that utilize other wireless protocols, such as Wi-Fi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, or other wireless communication protocols. Typically, such wireless access points 572 allow handheld or other portable computing devices (e.g., user interface devices) to communicative over a respective wireless network that is different from the wireless network 570 and that supports a different wireless protocol than the wireless network 570. In some scenarios, in addition to portable computing devices, one or more process control devices (e.g., controller 511, field devices 515-522, or wireless devices 535, 540-558) may also communicate using the wireless protocol supported by the access points 572.

Additionally in FIG. 10, one or more gateways 575, 578 to systems that are external to the immediate process control system 450 (such as lab information systems, maintenance systems, etc.) are big data nodes or devices BD of the process control big data network 500. Typically, such systems are customers or suppliers of information generated or operated on by the process control system 450. For example, a plant gateway node 575 may communicatively connect the immediate process plant 450 (having its own respective process control big data network backbone 505) with another process plant having its own respective process control big data network backbone. In another example, a single process control big data network backbone 505 may service multiple process plants or process control environments. In still another example, the plant gateway node 575 communicatively connects the immediate process plant 450 with a cloud big data node 410 and/or a cloud big data appliance 421.

In FIG. 10, a plant gateway node 575 communicatively connects the immediate process plant 450 to a legacy or prior art process plant that does not include a process control big data network 500 or backbone 505. In this example, the plant gateway node 575 may convert or translate messages between a protocol utilized by the process control big data backbone 505 of the plant 450 and a different protocol utilized by the legacy system (e.g., Ethernet, Profibus, Fieldbus, DeviceNet, etc.). The one or more external system gateway nodes 578 communicatively connect the process control big data network 500 with the network of an external public or private system, such as a laboratory system (e.g., Laboratory Information Management System or LIMS), an operator rounds database, a materials handling system, a maintenance management system, a product inventory control system, a production scheduling system, a weather data system, a shipping and handling system, a packaging system, the Internet, another provider's process control system, or other external systems.

Although FIG. 10 only illustrates a single controller 511 with a finite number of field devices 515-522 and 540-546, this is only an illustrative and non-limiting embodiment. Any number of controllers 511 may support big data, and any of the controllers 511 may communicate with any number of wired or wireless field devices 515-522, 540-546 to control a process in the plant 450. Furthermore, the process plant 450 may also include any number of wireless gateways 535, routers 558, access points 555, wireless process control communications networks 570, access points 572, and/or gateways 575, 578. Still further, FIG. 10 may include any number of centralized big data appliances 408, which may receive and store collected data and/or generated learned data or knowledge from any or all of the devices in the process plant 450. In some embodiments, the process control big data network 500 may include any number of regional big data appliances and nodes (not shown in FIG. 10).

Further, the combination of aspects, devices, and components included in the example process plant 450 as illustrated by FIG. 10 is exemplary only. The techniques, systems, methods, and apparatuses disclosed herein may be utilized in process plants with zero or more any of the aspects illustrated in FIG. 10. For example, the techniques, systems, methods, and apparatuses disclosed herein may be utilized in a process plant without a centralized big data appliance 408, or in a process plant with one or more regional big data appliances and/or nodes. In another example, the techniques, systems, methods, and apparatuses disclosed herein may be utilized in a process plant with only legacy devices.

Indeed, the apparatuses, systems, methods and techniques discussed herein for determining process element alignments during commissioning provide numerous benefits. While known techniques for determining process element alignment maps typically extract information from plant design documentation and synthesize the extracted information into a process element alignment map, such procedures are typically time consuming and costly. However, with the techniques disclosed herein, though, process element alignment data may be simply obtained during commissioning of process elements and transferred to the big data network supporting the process control system, where the process element alignment data can be stored and readily available for use to determine process elements alignment maps, perform learning, training and discovery functions and/or analyses, and the like. Other beneficial uses of process element alignment data obtained during the commissioning of process elements include, for example, using the captured image of a process element and its environment as well as the determined physical location to allow the process element to be easily located; automatic generation of images of portions of the flow path, process elements included therein; incorporation of descriptive information of process elements in the flow path images; as well as other benefits.

Figure 11:
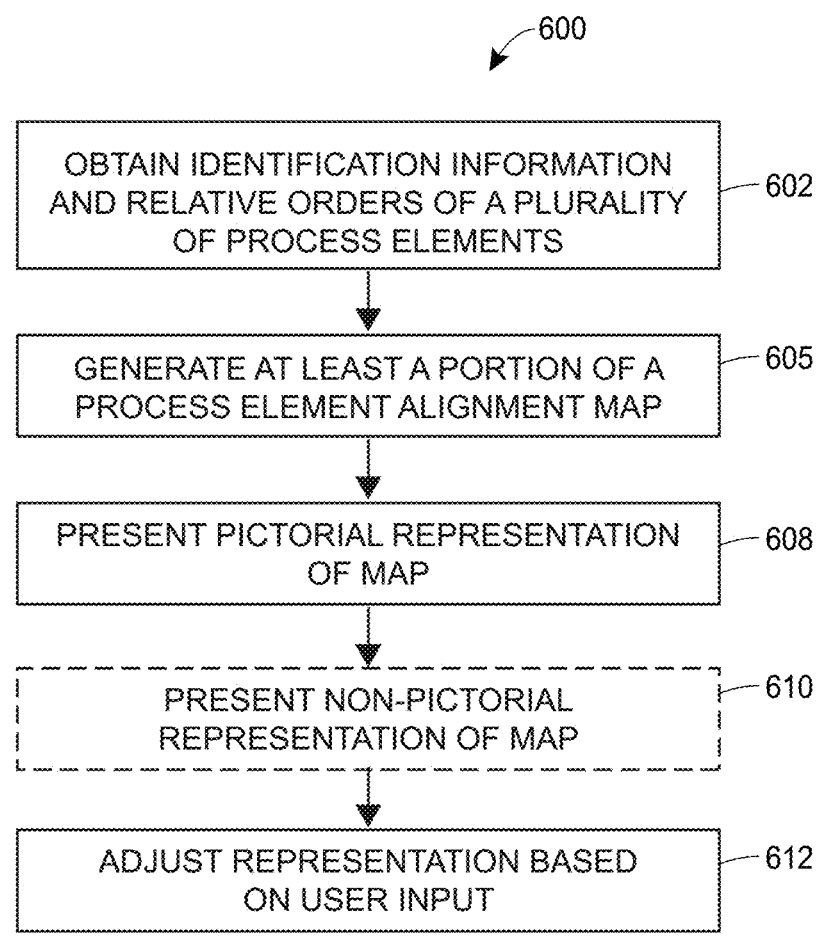
FIG. 11 depicts a flow diagram of an example method for determining process element alignment.

To further illustrate these and other benefits of the techniques disclosed herein, FIG. 11 depicts an example method 600 of determining process element alignment of a process that is being or that is to be controlled by a process plant. The method 600 may be utilized in conjunction with the systems of FIGS. 4, 8, 9 and/or 10, or with other suitable systems for determining process element alignment. Additionally or alternatively, the method 600 may be utilized in conjunction with the method 300 of FIG. 5, or with other suitable methods for determining process element alignment. For ease of discussion, though, and not for limitation purposes, the method 600 is discussed below with simultaneous reference to FIGS. 1-10.

At a block 602, the method 600 includes obtaining respective identification information and indications of respective relative orders for each of a plurality of field devices. The plurality of field devices is installed within a process plant and, when the plurality of field devices is on-line, the plurality of field devices operate to control a process within the process plant. Typically, though, the block 602 is executed after the plurality of field devices have been installed but prior to the plurality of field devices being activated for on-line operations. The respective identification information and identifications of respective relative orders of the plurality of field devices are obtained by a local device, such as the device 212. In an example, the local device may be a wireless commissioning device that obtains the respective identification information and indications of respective relative orders of the plurality of field devices while the wireless commissioning device is being used to commission the plurality of field devices. The identification information and indications of respective relative orders of the plurality of field devices may be as previously described with respect to the blocks 302 and 308 of FIG. 5, in an embodiment.

At a block 605, the method 600 includes generating at least a portion of a process element alignment map of the process. The generated process element alignment map (or portion thereof) is based on at least part of the information obtained at the block 602, and as such, indicates an order of activation of the plurality of field devices within a flow of the process.

While a representation of the process element alignment map (or portion thereof) may take any suitable format (e.g., such as shown in FIGS. 1 and 2A-2C), at a block 608, the method 600 includes presenting a pictorial representation or view of the process element alignment map (or portion thereof) on a display. As previously discussed with respect to FIGS. 6A-6D, the pictorial representation includes photographic images and/or graphical representations of the portion of the plant in which the plurality of field devices are installed. In some embodiments, the pictorial representation or view includes at least a portion of a panoramic image generated from images that were captured during commissioning of the plurality of field devices. At any rate, the pictorial representation of the process element alignment map (or portion thereof) indicates the respective locations of the plurality of field devices and the flow of the process through the plurality of field devices. For example, referring to FIG. 6D, the flow of the process through the Reaction Area is indicated by the reference 340. Of course, though, the indication of the flow of the process through the plurality of field devices on the pictorial representation may utilize any suitable indication.

In some embodiments, the method 600 optionally includes presenting a non-pictorial representation or view of the process element alignment map (or portion thereof) on the display (block 610). As previously discussed, the non-pictorial representation generally includes a minimal amount of graphics, and typically includes text and/or numbers in an ordered and/or grouped arrangement, such as shown in FIGS. 7A-7C. The non-pictorial representation also indicates the flow of the process through the plurality of field devices, e.g., by the arrangement of the text and/or numbers, and/or by some other suitable indication. When a non-pictorial representation is presented on a display, a user may be allowed to switch the viewing focus between the pictorial representation and the non-pictorial representation. Additionally or alternatively, a user may simultaneously view the pictorial and the non-pictorial representation in separate, resizable windows. Further, if a user makes a modification to either the pictorial or the non-pictorial representation (for example, by dragging and dropping an indication of a field device or process element from one location on the view to another location on the representation or view), the other representation is automatically changed, updated, or altered to reflect the modification.

Figure 12A:
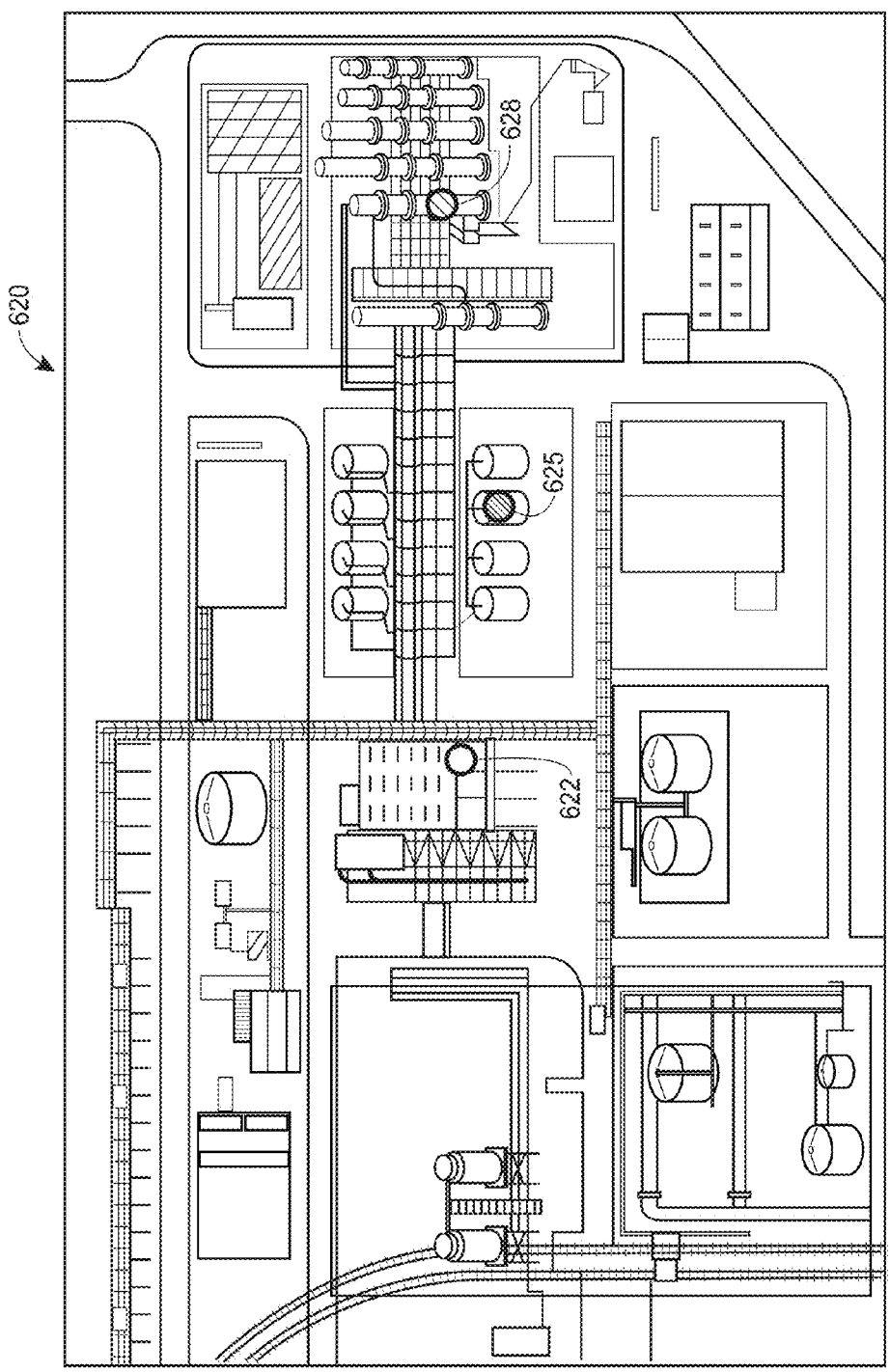
FIGS. 12A-12C depicts zoomed-in and zoomed-out views of a portion of a process plant.

So far, the blocks 608 and 610 have been discussed with respect to a scenario in which the plurality of field devices have been installed, but have not yet been activated for real-time control of the process. In some embodiments, though, the block 608 and/or the block 610 may be executed while the plurality of field devices is on-line and operating to control the process. In these embodiments, the indications of the field devices on the representation or display view may include indications of real-time operating values observed by or generated by the field devices while they are operating in real-time. To illustrate, FIG. 12A depicts an aerial, pictorial display view 620 of a process plant. The aerial view 620 may have been generated based on data or information obtained during the commissioning of field devices installed in the process plant within the boundaries of the view 620. Accordingly, the view 620 includes thereon indications of installed field devices 622, 625, 628 at their respective locations within the process plant. In FIG. 12A, the view 620 is being presented on a display (e.g., the display 228 of the device to 12) during real-time operations of the process plant. As such, the indications of the installed field devices 622, 625, 628 include indications of real-time operating values observed by said field devices 622, 625, 628. For example, the field devices 622, 628 are operating in a normal state, and therefore their corresponding indication 622, 628 are a green color. On the other hand, the field device 620 is in an alarmed state, and consequently its corresponding indication 625 is a red color. Of course, although differences in field device state are indicated in the view 625 by different colors, other indicators may be additionally or alternatively used, such as blinking, highlighting, encircling, or other suitable indicators.

Figure 12B:
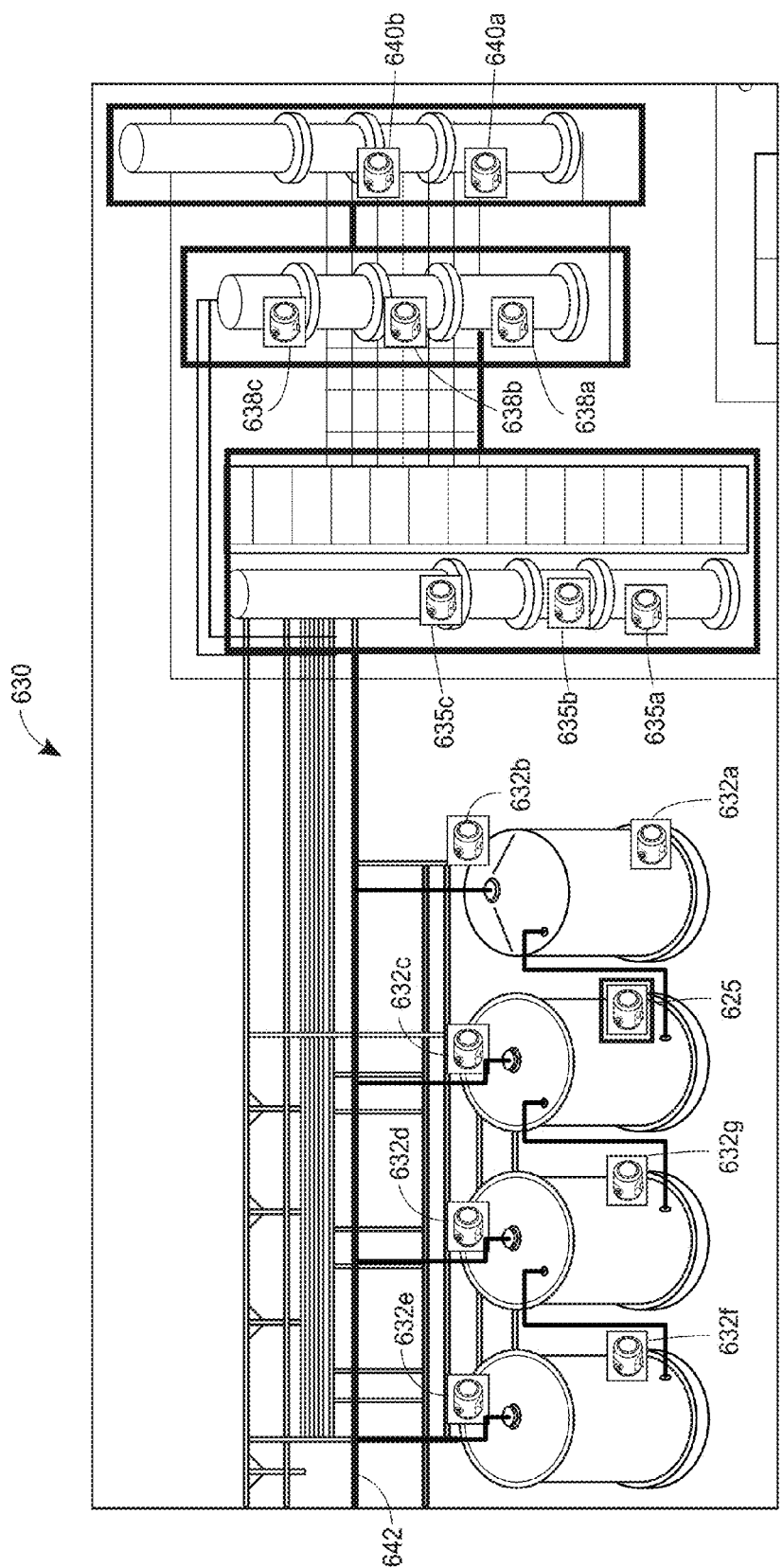

The method 600 includes adjusting the display of the pictorial representation or view and/or adjusting the display of the non-pictorial representation or view based on a user command (block 612). For example, a user sees the alarm indication 625 on the process plant pictorial view 620, and desires to obtain more information about the alarm. The user may request to zoom in on the pictorial view 620, and a resulting, enlarged view 630 of the desired zoomed in area is shown in FIG. 12B. As shown in FIG. 12B, additional, more detailed information about the zoomed-in area may automatically be displayed on the view 630. For example, the view 630 includes the indication of the alarmed field device 625 as well as indications of other process elements 632a-632g, 635a-635c, and 640a-640b at their respective locations within the boundaries of the enlarged view 630. Indications of real-time values observed by the process elements 625 632a-632g, 635a-635c, and 640a-640b may be displayed in conjunction with the indications of the process elements 625 and 632a-632g, 635a-635c, and 640a-640b. Additionally, if the view 630 is sufficiently enlarged, an indication of the process flow 642 may be indicated thereon.

Figure 12C:
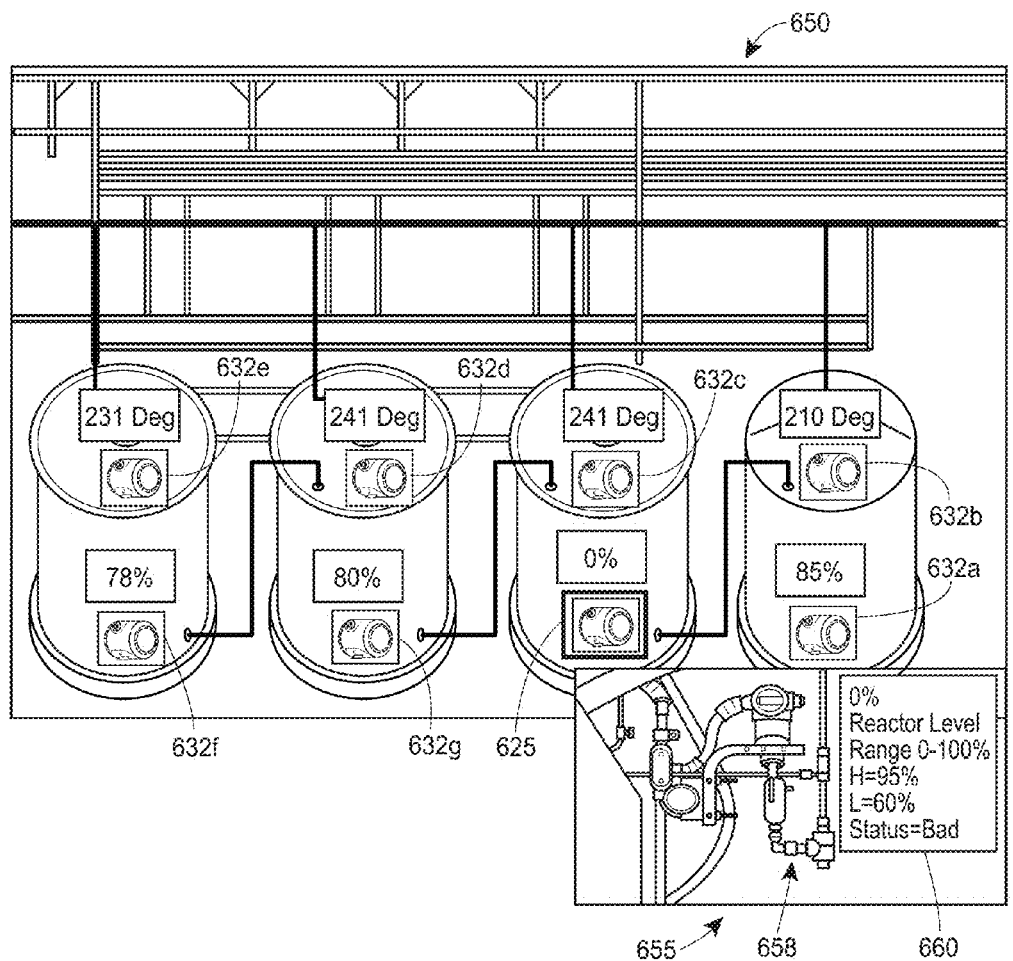

FIG. 12C depicts a further enlarged view 650 of a portion of the view 630. The further enlarged view 650 is displayed, for example, when the user requests a further zoom in on the view 630. On the view 650, additional real-time data is automatically displayed for at least some of the process elements included thereon. For example, a respective, real-time temperature observed by each of the process elements 632b-632e is automatically displayed on the view 650, and a respective, real-time throughput observed by each of the process elements 632a, 632f, 625 and 632g is also automatically displayed.

In FIG. 12C, the user has selected the alarmed process element 625 that is indicated on the display view 650 as presently having a 0% throughput. Upon the selection of the process element 625, a pop-up window 655 including an image 658 of the process element 625 installed in its environment within the process plant is presented. The image 658 may have been obtained or captured during the commissioning of the process element 625, e.g., by a local device or commissioning device. Other information corresponding to the process element 625 that was obtained during the commissioning of the process element 625 may also be displayed 660. For example, in FIG. 12C, indications of the reactor level range and the upper and lower boundaries of a normal operating range (i.e., 95% and 60%) are displayed. Additionally, in FIG. 12C, other real-time values observed by the process device 625 are also displayed, for example the "bad" status of the process element.

If a user desires to zoom out, he or she may indicate as such and a broader view (which may have been the previously displayed view) may be presented on the display. Further, although FIGS. 12A-12C of the process plant depict aerial views, the concepts described with respect thereto are easily applied to other types of views, such as equipment or street-level views of the process plant. Still further, it is noted that although FIGS. 12A-12C display pictorial representations or views of a process plant, the concepts described with respect to said figures are easily applied to non-pictorial representations or views.

Embodiments of the techniques described in the present disclosure may include any number of the following aspects, either alone or combination:

1. A method of determining process element alignment in a process, the method including obtaining, at a local device in conjunction with commissioning a field device installed in a process plant, identification information of the field device and an indication of a relative process order of the field device with respect to another process device to be used to control the process in the process plant; and providing the identification information and the indication of the relative process order of the field device for use in generating a process element alignment map of the process.

2. The method of the previous aspect, wherein the local device is a wireless commissioning device in physical proximity to the field device, and the method further includes verifying, at the local device and based on the obtained identification information, that the field device is an expected field device.

3. The method of any one of the previous aspects, wherein providing the identification information and the indication of the relative order of the field device for use in generating the process element alignment map includes providing the identification information and the indication of the relative order of the field device to a node of a big data network servicing the process plant.

4. The method of any one of the previous aspects, wherein obtaining the identification information of the field device includes obtaining data stored at the field device.

5. The method of the previous aspect, wherein obtaining the data stored at the field device includes at least one of obtaining data stored at a physical tag or label attached to an exterior of the field device, or obtaining data from a memory included in the field device.

6. The method of any one of the previous aspects, wherein obtaining the indication of the relative order of the field device with respect to the another process device is based on at least one of (i) an order in which the identification information of the field device and identification information of the another process device are obtained at the local device; or (ii) an indication of a placement of at least some of the obtained identification information of the field device on an image or representation of the environment in which the field device is located.

7. The method of any one of the previous aspects, wherein obtaining the indication of the relative order of the field device with respect to the another process device includes at least one of:

obtaining, via a position sensor included in the local device, data indicative of an absolute location of the field device;

obtaining, via a camera interface included in the local device, an image of field device situated in an environment; or obtaining, via a user interface included in the local device, the indication of the relative order of the field device.

8. The method of the previous aspect, wherein obtaining the indication of the relative order of the field device includes:

obtaining the image of the field device situated in the environment; and determining the relative order of the field device based on at least one of a location of the another process device indicated in the image of the field device situated in the environment, or the image of the field device situated in the environment and another image including the another process device situated in an overlapping environment.

9. The method of any one of the previous aspects, wherein obtaining the identification information of the field device and the indication of the relative order of the field device with respect to the another process device includes obtaining respective identification information of each of a plurality of field devices; and wherein obtaining the relative order of each of the plurality of field devices is based on user selections of the respective identification information.

10. The method of any one of the previous aspects, further including displaying, at the local device, the indication of the relative order of the field device with respect to the another process device; and receiving, via a user interface of the local device, a modification to the relative order.

11. The method of any one of the previous aspects, further including displaying, at the local device, the indication of the relative order of the field device with respect to the another process device, and receiving an indication of an approval of the relative order; and wherein providing the indication of the relative order of the field device for use in generating the process element alignment map includes providing the indication of the relative order of the field device for use in generating the process element alignment map upon receiving the indication of the approval of the relative order.

12. A apparatus or system for aligning process elements in a process, and optionally for performing the method of any one of the previous aspects, the apparatus or system including:

a memory storing respective data for each field device included in a plurality of field devices for controlling at least a portion of the process in a process plant, the respective data for the each field device including respective identification information of the each field device and a respective indication of a relative order of the each field device with respect to at least one other field device within a flow of the process;

an alignment generator configured to generate, based on the stored respective data of the plurality of field devices, a representation of an order of the plurality of field devices within the flow of the process, the generated representation being at least a portion of a process element alignment map of the process; and a display on which the at least the portion of the process element alignment map is presented.

13. The apparatus of the previous aspect, further including a device verifier configured to verify, during a commissioning of the each field device and based on the respective identification information of the each field device, that the each field device is an expected field device; and wherein the respective indication of the relative order of the each field device is obtained in conjunction with the commissioning of the each field device.

14. The apparatus of the previous aspect, wherein the apparatus is included in a wireless commissioning device that obtains the relative order of the each field device.

15. The apparatus of the previous aspect, further including at least one of a user interface, a camera interface, at least one communication interface, or a position sensor via which at least some of the respective data for the each field device is obtained.

16. The apparatus of any one of aspects 12-15, wherein the respective identification of the each field device includes data stored on at least one of: a tag attached to the each field device or a memory included in the each field device.

17. The apparatus of any one of aspects 12-16, wherein the respective indication of the relative order of the each field device is determined based on at least one of: an image, an indication of an absolute location of the each field device, or an indication of a process element that is upstream or downstream of the each field device.

18. The apparatus of any one of aspects 12-17, wherein the display is further configured to display indications of the respective data for the plurality of field devices; and wherein the alignment generator is configured to generate the at least the portion of the process element alignment map based on a user selection of at least a portion of the indications of the respective data for the plurality of field devices.

19. The apparatus of the previous aspect, wherein the user selection is an ordered selection.

20. The apparatus of any one of aspects 12-19, wherein the alignment generator is configured to automatically generate the at least a portion of the process element alignment map based on the stored relative orders of the plurality of field devices and without using any real-time user input.

21. The apparatus of any one of aspects 12-20, wherein the alignment generator is further configured to modify the at least the portion of the process element alignment map based on an indication of a modification to the at least the portion of the process element alignment map received at a user interface.

22. The apparatus of any one of aspects 12-21, wherein the apparatus further includes a communication interface via which the at least the portion of the process element alignment map is transmitted to a node of a process control big data network supporting the process plant.

23. The apparatus of the previous aspect, wherein the plurality of field devices control the at least the portion of the process by using a process control communication network included in the process plant.

24. The apparatus of any one of aspects 12-23, wherein the memory is a first memory, the apparatus further includes an analytics routine stored on the first memory or on a second memory, and the analytics routine operates on the at least the portion of the process element alignment map to generate learned knowledge.

25. A method of determining process element alignment in a process, the method optionally operating in conjunction with any one of the previous aspects, and the method including:
    obtaining, from a local device used to commission field devices installed in a process plant, respective identification information and indications of respective relative orders of a plurality of field devices within a flow of the process within the process plant;
    generating, based on the obtained respective identification information and the obtained indications of the respective relative orders of the plurality of field devices, at least a portion of a process element alignment map of the process, the at least the portion of the process element alignment map including an indication of an order of the plurality of field devices within a flow of the process; and
    presenting a pictorial representation of the at least the portion of the process element alignment map on a display, the pictorial representation indicating the process flow through the plurality of field devices.

26. The method of the previous aspect, further including presenting a non-pictorial representation of the at least a portion of the process element alignment map on the display, the non-pictorial representation including a respective indication of the process flow.

27. The method of the previous aspect, further including allowing a user to switch between viewing the pictorial representation and viewing the non-pictorial representation.

28. The method of any one of aspects 26-27, further including receiving a modification to one of the pictorial representation or the non-pictorial representation; and automatically updating the other one of the pictorial representation or the non-pictorial representation with the modification.

29. The method of the previous aspect, wherein receiving the modification includes receiving the modification at a user interface.

30. The method of any one of aspects 25-29, further including receiving an indication of a selection of a particular field device indicated on the pictorial representation; and, in response to receiving the indication of the selection, presenting, on the display, at least some of the respective identification information of the particular field device that was obtained by the local device in conjunction with a commissioning of the particular field device.

31. The method of the previous aspect, wherein the respective identification information that was obtained in conjunction with the commissioning of the particular field device includes an image of the particular field device installed in the process plant, and wherein presenting the at least some of the respective identification information of the particular field device on the display includes presenting the image of the particular field device installed in the process plant on the display.

32. The method of any one of aspects 30-31, further including presenting, on the display in conjunction with the at least some of the respective identification information of the particular field device, a real-time value generated at the particular field device while the particular field device operates to control the process.

33. The method of any one of aspects 25-32, further including one of:
    (i) receiving an indication to zoom in on a first portion of the pictorial representation, and in response to receiving the indication to zoom in, presenting an enlarged representation of the first portion on the display, the enlarged representation including additional information corresponding to one or more field devices indicated in the first portion; or
    (ii) receiving an indication to zoom out on the pictorial representation, and in response to receiving the indication to zoom out, reducing a size of the pictorial representation presented on the display and omitting, from the reduced-sized pictorial representation, at least some of previously displayed information corresponding to the one or more field devices.

34. The method of any one of aspects 25-33, wherein:
    obtaining the respective identification information and the indications of respective relative orders of the plurality of field devices includes obtaining a plurality of images of the plurality of field devices installed in the process plant, the plurality of images obtained by the local device during commissioning of the plurality of field devices;
    the method further includes combining at least some of the plurality of images into a panoramic image; and presenting the pictorial representation of the at least the portion of the process element alignment map includes presenting at least a part of the panoramic image.

35. The method of any one of aspects 25-34, wherein presenting the pictorial representation of the at least the portion of the process element alignment map on the display includes presenting the pictorial representation of the at least the portion of the process element alignment map on a display of the local device.

36. Any one of the preceding aspects in combination with any one or more other preceding aspects.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed:

1. A method of determining process element alignment in a process, the method comprising:
    obtaining, at a local device operated by a user during commissioning of a field device installed in a process plant, identification information of the field device;
    determining, by the local device based on a physical location at which the field device is installed, a relative process order of the field device with respect to another process device to be used to control the process in the process plant; and
    providing, by the local device, the identification information and an indication of the relative process order of the field device for use in generating a process element alignment map of the process, the process alignment map of the process indicating an order of activation of each of a plurality of process elements in a flow of materials within the process plant while the process is being controlled, the plurality of process elements including the field device and the another process device.

2. The method of claim 1, wherein the local device is a wireless commissioning device in physical proximity to the field device, and commissioning the field device comprises verifying, at the local device and based on the obtained identification information, that the field device is an expected field device.

3. The method of claim 1, wherein providing the identification information and the indication of the relative process order of the field device for use in generating the process element alignment map comprises providing the identification information and the indication of the relative process order of the field device to a node of a big data network servicing the process plant.

4. The method of claim 1, wherein obtaining the identification information of the field device comprises obtaining data stored at the field device.

5. The method of claim 4, wherein obtaining the data stored at the field device includes at least one of:
    obtaining data stored at a physical tag or label attached to an exterior of the field device; or
    obtaining data from a memory included in the field device.

6. The method of claim 1, wherein determining, based on the physical location at which the field device is installed, the relative process order of the field device with respect to the another process device comprises determining the relative process order of the field device with respect to the another process device based on at least one of:
    an order in which the identification information of the field device and identification information of the another process device are obtained at the local device operated by the user; or
    an indication of a placement of at least some of the obtained identification information of the field device on an image or representation of an environment in which the field device is located.

7. The method of claim 1, wherein determining, based on the physical location at which the field device is installed, the relative process order of the field device with respect to the another process device comprises at least one of:
    obtaining, via a position sensor included in the local device, data indicative of an absolute physical location of the field device;
    obtaining, via a camera interface included in the local device, an image of field device situated in an environment; or
    obtaining, via a user interface included in the local device and based on the physical location at which the field device is installed, the indication of the relative process order of the field device.

8. The method of claim 7, wherein determining, based on the physical location at which the field device is installed, the relative process order of the field device comprises:
    obtaining the image of the field device situated in the environment; and
    determining the relative process order of the field device based on at least one of:
        a location of the another process device indicated in the image of the field device situated in the environment; or
        the image of the field device situated in the environment and another image including the another process device situated in an overlapping environment.

9. The method of claim 1, wherein:
    obtaining, at the local device, the identification information of the field device comprises obtaining, at the local device, respective identification information of each of a plurality of field devices; and
    the method further comprises determining the relative process order of each of the plurality of field devices based on user selections of the respective identification information.

10. The method of claim 1, further comprising:
displaying, at the local device, the indication of the relative process order of the field device with respect to the another process device; and
receiving, via a user interface of the local device, a modification to the relative process order.

11. The method of claim 1, further comprising displaying, at the local device, the indication of the relative process order of the field device with respect to the another process device, and receiving an indication of an approval of the relative process order; and
wherein providing the indication of the relative process order of the field device for use in generating the process element alignment map comprises providing the indication of the relative process order of the field device for use in generating the process element alignment map upon receiving the indication of the approval of the relative process order.

12. A method of determining process element alignment in a process, the method comprising:
obtaining, from a local device operated by a user to commission field devices installed in a process plant, respective identification information of a plurality of field devices;
determining, by the local device based on respective physical locations at which the plurality of field devices are installed, respective relative ordering of each of the plurality of field devices in a flow of materials within the process plant while the process is being controlled;
generating, based on the obtained respective identification information and the determined indications of the respective relative orderings of the plurality of field devices, at least a portion of a process element alignment map of the process, the at least the portion of the process element alignment map including an indication of respective order of activation of each of the plurality of field devices within the flow of materials corresponding to the process; and
presenting a pictorial representation of the at least the portion of the process element alignment map on a display.

13. The method of claim 12, further comprising presenting a non-pictorial representation of the at least a portion of the process element alignment map on the display, the non-pictorial representation including a respective indication of a respective activation of each of a plurality of process elements within the flow of materials corresponding to the process, the plurality of process elements including the plurality of field devices, a plurality of process variables, and a plurality of measurements.

14. The method of claim 13, further comprising allowing a user to switch between viewing the pictorial representation and viewing the non-pictorial representation.

15. The method of claim 13, further comprising:
receiving a modification to one of the pictorial representation or the non-pictorial representation; and
automatically updating the other one of the pictorial representation or the non-pictorial representation with the modification.

16. The method of claim 15, wherein receiving the modification comprises receiving the modification at a user interface.

17. The method of claim 12, further comprising:
receiving an indication of a selection of a particular field device indicated on the pictorial representation; and
in response to receiving the indication of the selection, presenting, on the display, at least some of the respective identification information of the particular field device that was obtained by the local device operated by the user to commission the field devices installed in the process plant.

18. The method of claim 17, wherein:
the respective identification information of the particular field device includes an image of the particular field device installed in the process plant, and
presenting the at least some of the respective identification information of the particular field device on the display comprises presenting the image of the particular field device installed in the process plant on the display.

19. The method of claim 17, further comprising presenting, on the display in conjunction with the at least some of the respective identification information of the particular field device, a real-time value generated at the particular field device while the particular field device operates to control the process.

20. The method of claim 12, further comprising one of:
(i) receiving an indication to zoom in on a first portion of the pictorial representation, and in response to receiving the indication to zoom in, presenting an enlarged representation of the first portion on the display, the enlarged representation including additional information corresponding to one or more field devices indicated in the first portion; or
(ii) receiving an indication to zoom out on the pictorial representation, and in response to receiving the indication to zoom out, reducing a size of the pictorial representation presented on the display and omitting, from the reduced-sized pictorial representation, at least some of previously displayed information corresponding to the one or more field devices.

21. The method of claim 12, wherein:
determining the respective relative ordering of the each of the plurality of field devices comprises determining the respective relative ordering of the each of the plurality of field devices from a plurality of images of the plurality of field devices installed in the process plant, the plurality of images obtained by the local device during commissioning of the plurality of field devices;
the method further comprises combining at least some of the plurality of images into a panoramic image; and
presenting the pictorial representation of the at least the portion of the process element alignment map comprises presenting at least a part of the panoramic image.

22. The method of claim 12, wherein presenting the pictorial representation of the at least the portion of the process element alignment map on the display comprises presenting the pictorial representation of the at least the portion of the process element alignment map on a display of the local device.

* * * * *